(12) United States Patent
Koyama

(10) Patent No.: US 12,443,673 B2
(45) Date of Patent: Oct. 14, 2025

(54) INFORMATION PROCESSING APPARATUS OF ADJUSTING TEMPERATURE RANGE IN SOLVING OPTIMIZATION PROBLEM, COMPUTER-IMPLEMENTED METHOD OF ADJUSTING TEMPERATURE RANGE IN SOLVING OPTIMIZATION PROBLEM, AND NON-TRANSITORY COMPUTER-READABLE STORAGE MEDIUM FOR STORING PROGRAM OF ADJUSTING TEMPERATURE RANGE IN SOLVING OPTIMIZATION PROBLEM

(71) Applicant: FUJITSU LIMITED, Kawasaki (JP)

(72) Inventor: Jumpei Koyama, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 1087 days.

(21) Appl. No.: 17/165,989

(22) Filed: Feb. 3, 2021

(65) Prior Publication Data

US 2021/0334332 A1 Oct. 28, 2021

(30) Foreign Application Priority Data

Apr. 27, 2020 (JP) ................. 2020-078506

(51) Int. Cl.
*G06F 17/10* (2006.01)
*G06F 17/11* (2006.01)
*G06N 7/01* (2023.01)

(52) U.S. Cl.
CPC ............... *G06F 17/11* (2013.01); *G06N 7/01* (2023.01)

(58) Field of Classification Search
CPC .......... G06F 17/11; G06F 9/28; G06F 9/3004; G06F 18/295; G06N 7/01; G06N 10/00; G06N 5/01
See application file for complete search history.

(56) References Cited

U.S. PATENT DOCUMENTS 10,592,629 B2  3/2020  Matsubara et al.
2019/0235834 A1  8/2019  Yoneoka
(Continued)

FOREIGN PATENT DOCUMENTS

CA  3108047 A1  3/2020
JP  H09-034951 A  2/1997
(Continued)

OTHER PUBLICATIONS

Wang, Wenlong, Jonathan Machta, and Helmut G. Katzgraber. "Comparing Monte Carlo methods for finding ground states of Ising spin glasses: Population annealing, simulated annealing, and parallel tempering." Physical Review E 92.1 (2015): 013303. (Year: 2015).*

(Continued)

*Primary Examiner* — Nithya J. Moll
(74) *Attorney, Agent, or Firm* — Fujitsu Intellectual Property Center

(57) ABSTRACT

A method includes: acquiring, from a search node configured to perform a search for a ground state represented by plural state variables included in an energy function by using plural temperature values and hold a value of the energy function for the plural state variables, a value of the energy function obtained for the plural state variables at a first temperature value among the plural temperature values; determining whether the value acquired is smaller than a smallest value of the energy function obtained for the plural state variables before reaching the first temperature value; recording update information indicating that the smallest value has been updated at the first temperature value in a case where the value is smaller than the smallest value; and outputting a second temperature value based on the first temperature value at which the update information has been recorded among the plural temperature values.

8 Claims, 14 Drawing Sheets

(56) References Cited

U.S. PATENT DOCUMENTS

2019/0278829 A1 9/2019 Takatsu
2020/0042570 A1 2/2020 Tamura
2021/0192109 A1 6/2021 Sasaki et al.

FOREIGN PATENT DOCUMENTS

JP 2019-133651 A 8/2019
WO 2020/054024 A1 3/2020

OTHER PUBLICATIONS

Okuyama, Takuya, Masato Hayashi, and Masanao Yamaoka. "An Ising computer based on simulated quantum annealing by path integral Monte Carlo method." 2017 IEEE international conference on rebooting computing (ICRC). IEEE, 2017. (Year: 2017).*
Miki, Mitsunori et al., "Improvement in the efficiency of SA based on the optimal temperature search", Collection of Lecture Papers (1) at the 63rd National Convention of Information Processing Society of Japan (IPSJ), pp. 109-110, Sep. 26, 2001, cited in JPOA mailed on Jan. 9, 2024 for corresponding Japanese Patent Application No. 2020-078506.
Japanese Office Action mailed Jan. 9, 2024 for corresponding Japanese Patent Application No. 2020-078506, with English Translation, 7 pages.
Extended European Search Report dated Jul. 8, 2021 for corresponding European Patent Application No. 21152930.0, 9 pages.
European Office Action dated Oct. 27, 2023 for corresponding European U.S. Appl. No. 10/592,629, 6 pages.
Chinese Office Action mailed Oct. 29, 2024 for corresponding Chinese Patent Application No. 202110183733.3 with, English Translation, 23 pages.
Chinese Office Action mailed Feb. 18, 2025 for corresponding Chinese Patent Application No. 202110183733.3, 21 pages, with English Translation.
European Patent Office Action date May 2, 2025 for corresponding European Patent Application No. 211529300, 5 pages.

* cited by examiner

INFORMATION PROCESSING APPARATUS OF ADJUSTING TEMPERATURE RANGE IN SOLVING OPTIMIZATION PROBLEM, COMPUTER-IMPLEMENTED METHOD OF ADJUSTING TEMPERATURE RANGE IN SOLVING OPTIMIZATION PROBLEM, AND NON-TRANSITORY COMPUTER-READABLE STORAGE MEDIUM FOR STORING PROGRAM OF ADJUSTING TEMPERATURE RANGE IN SOLVING OPTIMIZATION PROBLEM

CROSS-REFERENCE TO RELATED APPLICATION

This application is based upon and claims the benefit of priority of the prior Japanese Patent Application No. 2020-78506, filed on Apr. 27, 2020, the entire contents of which are incorporated herein by reference.

FIELD

The embodiments discussed herein are related to an information processing apparatus, an information processing method, and a non-transitory computer-readable storage medium storing a program.

BACKGROUND

There is an information processing apparatus that calculates a multivariate optimization problem which the Neumann-type computer is not good at by replacing the optimization problem with an Ising model which is a model representing a behavior of spin of a magnetic body. The information processing apparatus searches for a ground state in which the value of an energy function corresponding to the problem is the smallest by a Markov chain Monte Carlo method such as, for example, a simulated annealing (SA) method or a replica exchange method. The ground state corresponds to the optimal solution of the optimization problem. In the search by the Markov chain Monte Carlo method, a temperature value may be used as a parameter.

For example, there has been proposed an optimization apparatus in which a state of an Ising model is represented by a plurality of state variables, for example, a plurality of bits, and which calculates a combination of values of respective bits where the value of the energy function is the smallest by performing the SA method using a digital circuit.

There is also a proposal of a combinatorial optimization method in which, when a combinatorial optimization problem including a plurality of evaluation items is solved by using the SA method, a weight coefficient of each evaluation item is dynamically changed along with a change in a temperature parameter.

Examples of the related art include Japanese Laid-open Patent Publication No. 2019-133651 and Japanese Laid-open Patent Publication No. 9-34951.

SUMMARY

According to an aspect of the embodiments, provided is an information processing method implemented by a computer. In an example, the method includes: acquiring, from a search circuit configured to perform a search for a ground state represented by a plurality of state variables included in an energy function by using a plurality of temperature values and hold a value of the energy function for the plurality of state variables, a value of the energy function obtained for the plurality of state variables at a first temperature value among the plurality of temperature values; determining whether the value acquired is smaller than a smallest value of the energy function obtained for the plurality of state variables before reaching the first temperature value; recording update information indicating that the smallest value has been updated at the first temperature value in a case where the value is smaller than the smallest value; and outputting a second temperature value based on the first temperature value at which the update information has been recorded among the plurality of temperature values.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

It is not easy to appropriately determine temperature values used in the SA method, the replica exchange method, or the like in accordance with a problem.

In one aspect of the embodiments, provided is a solution to efficiently acquire temperature values suitable for a problem.

Hereinafter, the embodiments will be described with reference to the drawings.

First Embodiment

A first embodiment will be described.

Figure 1:
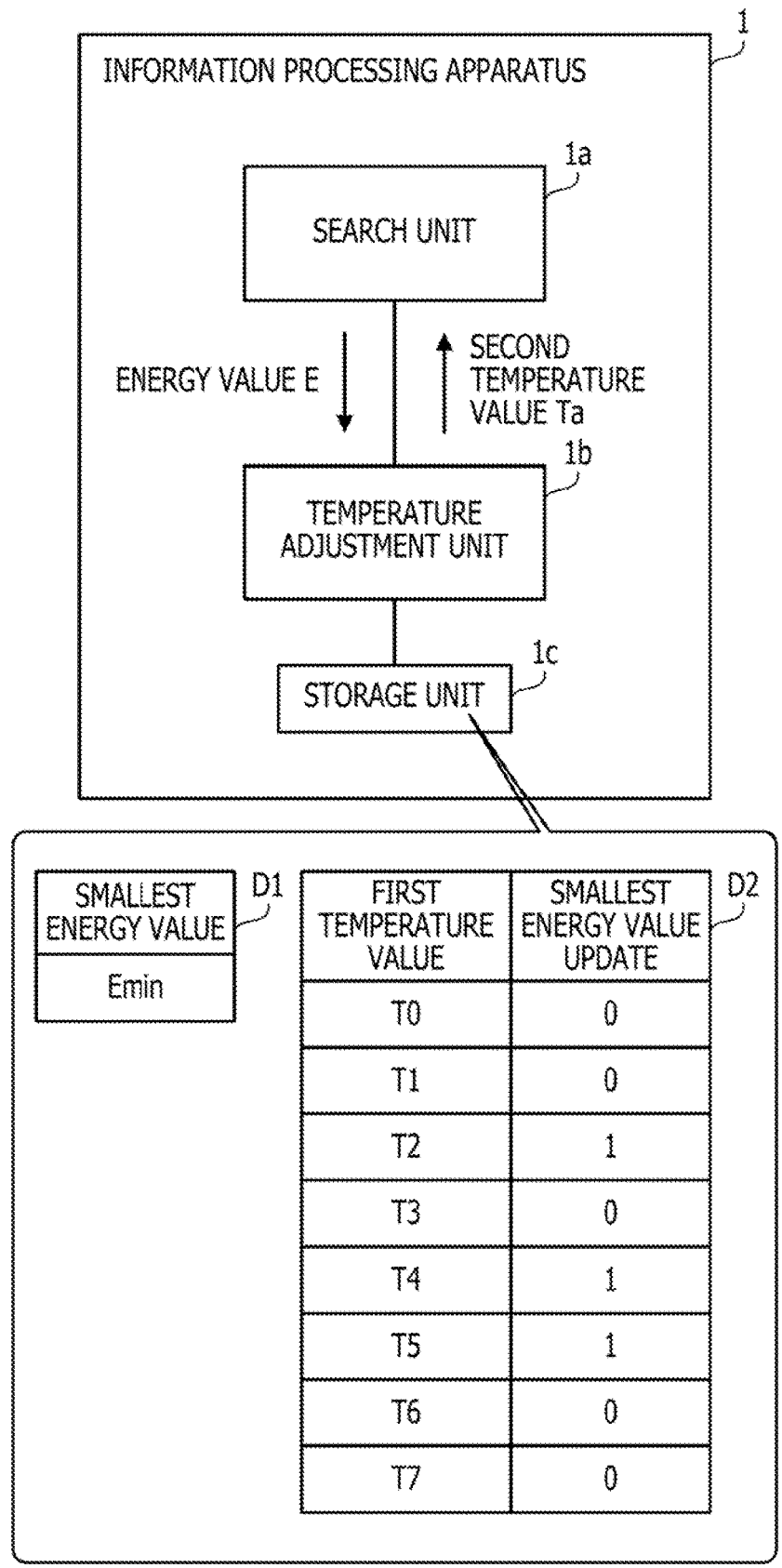
FIG. 1 illustrates an example of processing of an information processing apparatus according to a first embodiment.

FIG. 1 illustrates an example of processing of an information processing apparatus according to the first embodiment.

An information processing apparatus 1 performs a search for the smallest energy state of an Ising model, for example, the ground state, by the Markov chain Monte Carlo method such as the SA method or the replica exchange method, based on an Ising-type energy function obtained by formulating a combinatorial optimization problem. The ground state corresponds to the optimal solution of the combinatorial optimization problem. The energy function represents an energy value corresponding to a state represented by values of a plurality of state variables. The energy function is also referred to as an evaluation function or an objective function. The state variable is a binary variable taking a value of "0" or "1".

An Ising-type energy function E(x) is expressed by, for example, formula (1)

$$E(x) = -\sum_{(i,j)} W_{ij} x_i x_j - \sum_i b_i x_i \quad (1)$$

A state vector x has a plurality of state variables as elements, and represents a state of an Ising model. In a case of a problem of maximizing energy, the sign of the energy function may be reversed.

The first term on the right side of formula (1) adds up the products of values of two state variables and coupling coefficients without omission and duplication for all combinations of two state variables that are selectable from all state variables. $x_i$ is an i-th state variable. $x_j$ is a j-th state variable. $W_{ij}$ is a weight coefficient indicating the weight, or the strength of coupling, between the i-th state variable and the j-th state variable.

The second term on the right side of formula (1) is a sum of the products of respective bias coefficients for all state variables and values of the state variables. $b_i$ indicates a bias coefficient for the i-th state variable.

For example, "−1" of a spin in an Ising model corresponds to a value "0" of the state variable. "+1" of a spin in the Ising model corresponds to a value "1" of the state variable. Thus, the state variable may also be referred to as a bit taking a value of 0 or 1.

The information processing apparatus 1 includes a search unit 1a, a temperature adjustment unit 1b, and a storage unit 1c. The information processing apparatus 1 is realized by using, for example, a semiconductor integrated circuit such as a field-programmable gate array (FPGA). In this case, a search circuit, a temperature adjustment circuit, and a memory circuit realized by using the semiconductor integrated circuit function as the search unit 1a, the temperature adjustment unit 1b, and the storage unit 1c, respectively. The storage unit 1c may be included in the temperature adjustment unit 1b. For example, the temperature adjustment circuit may include a memory circuit.

The search unit 1a performs a search for the ground state represented by the plurality of state variables included in the energy function by using a plurality of temperature values. A temperature value is a value indicating a temperature. The search unit 1a holds a value of the energy function for a plurality of state variables.

In the search for the ground state, state transition is repeatedly executed by changing a certain state variable, for example, bit. A Metropolis method or a Gibbs method is used to determine a probability of transition from a certain state to the next state by changing a certain bit. For example, the search unit 1a determines whether to allow the change of the bit, based on a comparison result between an energy change when any bit of a plurality of bits is changed and a noise value. In a case where the search unit 1a determines to allow the change, the search unit causes state transition to occur by changing the value of the bit. A noise value is obtained based on a temperature value or a random number. As the temperature value increases, the amplitude of the noise value increases.

The search unit 1a sets a relatively high temperature value as the first maximum temperature value used for the search. The search unit 1a sets a relatively low temperature value as the first minimum temperature value. For example, the search unit 1a determines a temperature value tmp[i] used for the search based on formulae (2) and (3).

$$tmp[i] = tmp\_min \cdot \exp\left(\frac{i}{denom}\right) \quad (2)$$

$$denom = \frac{N-1}{\log\left(\frac{tmp\_max}{tmp\_min}\right)} \quad (3)$$

i is an integer satisfying $0 \leq i \leq N-1$ and is an identification number of a temperature value. tmp_max is a maximum temperature value. tmp_min is a minimum temperature value. log in formula (3) indicates a common logarithm. The search unit 1a calculates an i-th initial temperature value by formulae (2) and (3) using an initial maximum temperature value and an initial minimum temperature value.

For example, when the SA method is used, the search unit 1a performs a search while gradually decreasing the temperature from the initial maximum temperature value to the initial minimum temperature value. As will be described later, the search unit 1a may also use a plurality of sets of the plurality of state variables to search for the ground state individually with each set.

Based on the search result at each of the plurality of temperature values from a maximum temperature value to a minimum temperature value by the search unit 1a, the temperature adjustment unit 1b determines new temperature values for solving the corresponding combinatorial optimization problem or a combinatorial optimization problem of the same type as the combinatorial optimization problem. For example, temperature adjustment is performed in the following manner.

When a search by the search unit 1a at a certain temperature value among the plurality of temperature values is completed, the temperature adjustment unit 1b acquires, from the search unit 1a, the value E of the energy function corresponding to the values of the plurality of state variables obtained by the search at the temperature value. The value of the energy function may be referred to as an energy value. The "certain temperature value" at which the search has been performed is referred to as a first temperature value. The temperature adjustment unit 1b acquires, as the energy value E, for example, an energy value for a state reached by the search unit 1a when the search at the first temperature value is completed. Alternatively, the temperature adjustment unit 1b may acquire the smallest energy value obtained by the search unit 1a from the search unit 1a in the process of the search at the first temperature value.

The temperature adjustment unit 1b determines whether the energy value E acquired from the search unit 1a is smaller than the smallest value of the energy function obtained for the plurality of state variables before reaching the first temperature value, for example, the smallest energy value Emin. The smallest energy value Emin obtained by that time point is held in the storage unit 1c as smallest energy value information D1.

A predetermined value may be set in the storage unit 1c in advance as an initial value of the smallest energy value Emin. In this case, the temperature adjustment unit 1b may use the initial value of the smallest energy value Emin for the determination at the time of completion of the search at the first one of the temperature values. Alternatively, in a case where the initial value of the smallest energy value Emin is not set in the storage unit 1c in advance, the temperature adjustment unit 1b may acquire the initial value of the smallest energy value Emin at the time of completion of the search at the first one of the temperature values, and may perform the determination after the search at the second one of the temperature values.

In a case where the energy value E acquired this time is smaller than the previous smallest energy value Emin, for example, in a case of E<Emin, the temperature adjustment unit 1b records update information indicating that the smallest value of the energy function has been updated at the first temperature value. The update information is stored in the storage unit 1c.

For example, update information of each temperature value is held in the storage unit 1c as update management information D2. The update management information D2 includes items of first temperature value and smallest energy value update. The first temperature value currently used by the search unit 1a or an index of the first temperature value is set in the item of first temperature value. Information indicating whether the smallest energy value Emin has been updated at the first temperature value is set in the item of smallest energy value update.

For example, when Emin has been updated at the corresponding first temperature value, the item of smallest energy value update is "1". When Emin has not been updated at the corresponding first temperature value, the item of smallest energy value update is "0". An initial value of the item of smallest energy value update is "0". In this case, a record in which the smallest energy value update "1" of the update management information D2 is set is an example of update information. As described later, the temperature adjustment unit 1b may record the number of times the smallest energy value Emin has been updated in the item of smallest energy value update.

When E<Emin, the temperature adjustment unit 1b updates the smallest energy value Emin held in the storage unit 1c to the energy value E obtained this time.

When the acquired energy value E is equal to or larger than the smallest energy value Emin, the temperature adjustment unit 1b does not record update information for the first temperature value.

When the search by the search unit 1a at the plurality of temperature values from the maximum temperature value to the minimum temperature value is completed, the temperature adjustment unit 1b determines a second temperature value Ta based on the first temperature value for which update information is recorded, and outputs the second temperature value Ta. For example, the second temperature value Ta may include both or any one of a new maximum temperature value and a new minimum temperature value.

For example, the plurality of temperature values are eight temperature values of T0 to T7. Each of the temperature values T0 to T7 is an example of the first temperature value. The temperature values T0 to T7 satisfy T0<T1<T2< . . . <T7. It is assumed that update information is recorded for the temperature values T2, T4, and T5 in the update management information D2 at the time point when searches at all of the temperature values T0 to T7 are completed. In this case, for example, the temperature adjustment unit 1b determines the second temperature value that is a new temperature value based on the temperature values T2 to T5.

In one example, the temperature adjustment unit 1b sets the temperature value T2, which is the smallest value among the temperature values T2 to T5, as a new minimum temperature value, and sets the temperature value T5, which is the largest value among the temperature values T2 to T5, as a new maximum temperature value. Alternatively, the temperature adjustment unit 1b may set a value that is smaller than or larger than the temperature value T2 by a predetermined value as a new minimum temperature value, or may set a value that is smaller than or larger than the temperature value T5 by a predetermined value as a new maximum temperature value. The temperature adjustment unit 1b may determine only one of the minimum temperature value and the maximum temperature value as the second temperature value, and may reuse the current minimum temperature value or the current maximum temperature value for the temperature value that is not determined. As another example, the temperature adjustment unit 1b may determine a new maximum temperature value based on the largest temperature value that is larger than a predetermined threshold among the temperature values T2 to T5, or may determine a new minimum temperature value based on the smallest temperature value that is smaller than the threshold among the temperature values T2 to T5.

For example, the temperature adjustment unit 1b outputs a new minimum temperature value T2 and a new maximum temperature value T5 to the search unit 1a.

The search unit 1a sets tmp_max=T5 and tmp_min=T2 and calculates other new temperature values by formulae (2) and (3). As a result, eight new temperature values are determined within the range of the temperature values T2 to T5. The difference between adjacent temperature values determined within the range of the temperature values T2 to T5 is smaller than the difference between the original adjacent temperature values within the range of the temperature values T0 to T7. The search unit 1a performs a search for the ground state for the corresponding combinatorial optimization problem by using the new temperature values.

The output destination of the second temperature value Ta by the temperature adjustment unit 1b may be a device outside the information processing apparatus 1 or may be the storage unit 1c. For example, the temperature adjustment unit 1b may store the second temperature value Ta in a storage device coupled to the information processing apparatus 1, and may make the second temperature value Ta available in solving another combinatorial optimization problem of the same type as the current combinatorial optimization problem.

According to the information processing apparatus 1, a search for the ground state represented by a plurality of state variables included in the energy function is performed by using a plurality of temperature values. A value of the energy function obtained for the plurality of state variables at the first temperature value among the plurality of temperature values is acquired. It is determined whether the acquired value is smaller than the smallest value of the energy function obtained for the plurality of state variables before reaching the first temperature value. In a case where the value is smaller than the smallest value, update information indicating that the smallest value has been updated at the first temperature value is recorded. The second temperature value is output based on the first temperature value at which update information is recorded among the plurality of temperature values.

Thus, temperature values suitable for a problem may be acquired.

For example, when temperature values are too high or too low, the smallest energy value may not be updated in a search by the search unit 1a. If the smallest energy value is not updated, it means that state transition does not progress in a direction in which the energy value decreases at the corresponding temperature value, and does not contribute to the search for the ground state. Therefore, the information processing apparatus 1 determines new temperature values, for example, the second temperature value based on the result that the smallest energy value has been updated, and thus may exclude unwanted temperature values that do not contribute to the search for the ground state. In this manner, the information processing apparatus 1 may acquire temperature values suitable for a problem. Since the information processing apparatus 1 performs a search based on the determined new temperature values, a search using unwanted temperature values is no longer performed. With appropriate temperature values, state transition in a direction in which the energy value decreases may be facilitated. As a result, a solution may be efficiently obtained.

As described above, the search unit 1a may use a plurality of sets of the plurality of state variables to perform the search for the ground state by each of the plurality of sets.

For example, the search unit 1a may execute the searches by the respective sets serially, such as starting the search at a plurality of temperature values by the second set among the plurality of sets after completing the search at the plurality of temperature values by the first set among the plurality of sets. In this case, the temperature adjustment unit 1b may record the number of times the smallest energy value Emin has been updated, for example, the number of times of update, in the item of smallest energy value update in the update management information D2. It is also considered that the temperature adjustment unit 1b specifies two or more temperature values at which the number of times the smallest energy value Emin has been updated is larger than a threshold among the temperature values, sets the largest value among the two or more temperature values as a new maximum temperature value, and sets the smallest value among the two or more temperature values as a new minimum temperature value.

The search unit 1a may perform the search for the ground state in parallel by each of the plurality of sets of state variables. For example, one of the plurality of sets of state variables may be referred to as a replica. The search unit 1a may perform the search for the ground state by the replica exchange method by using a plurality of replicas. In a case where the replica exchange method is used, the search unit 1a uses N temperature values for N replicas. In an initial stage, an i-th temperature value tmp[i] is set for an i-th replica among the N replicas.

The search unit 1a starts a search for the ground state by the N replicas, and when a predetermined time elapses, obtains an energy value reached by the search at the temperature value set in each of the N replicas. The search unit 1a exchanges temperature values between a pair of replicas based on an exchange probability calculated from a pair of energy values obtained in the pair of replicas. Exchanging temperature values between a pair of replicas may be referred to as "replica exchange". An exchange probability p is expressed by formula (4).

$$p = \exp\left\{(E_i - E_j)\left(\frac{1}{kT_i} - \frac{1}{kT_j}\right)\right\} \quad (4)$$

$E_i$ is an energy value obtained by the i-th replica. $E_j$ is an energy value obtained by a j-th replica. $T_i$ is a temperature value of the i-th replica. $T_j$ is a temperature value of the j-th replica. k is a Boltzmann constant. When the difference between temperature values is large, the exchange probability p tends to be low. Therefore, the search unit 1a may evaluate the exchange probability p only for pairs of replicas corresponding to pairs of adjacent temperature values, and determine whether to perform replica exchange.

Based on the search result obtained by the replica exchange method from the maximum temperature value to the minimum temperature value, the temperature adjustment unit 1b may determine new temperature values to be used when solving the corresponding combinatorial optimization problem or another combinatorial optimization problem of the same type as the combinatorial optimization problem.

In this case, the temperature adjustment unit 1b records the smallest energy value information D1 in the storage unit 1c for each replica. The temperature adjustment unit 1b prepares one piece of update management information D2 for all of the plurality of replicas, and updates the update management information D2 based on the search result at each temperature value in each of the plurality of replicas. As described above, the temperature adjustment unit 1b may record information indicating whether the smallest energy value Emin has been updated at each temperature value in the item of smallest energy value update in the update management information D2, or may record the number of times of update of the smallest energy value Emin.

Next, an example in which, in a case where the replica exchange method is used, a new temperature value is determined in accordance with the number of times of update of the smallest energy value Emin at each temperature value will be described.

Figure 2:
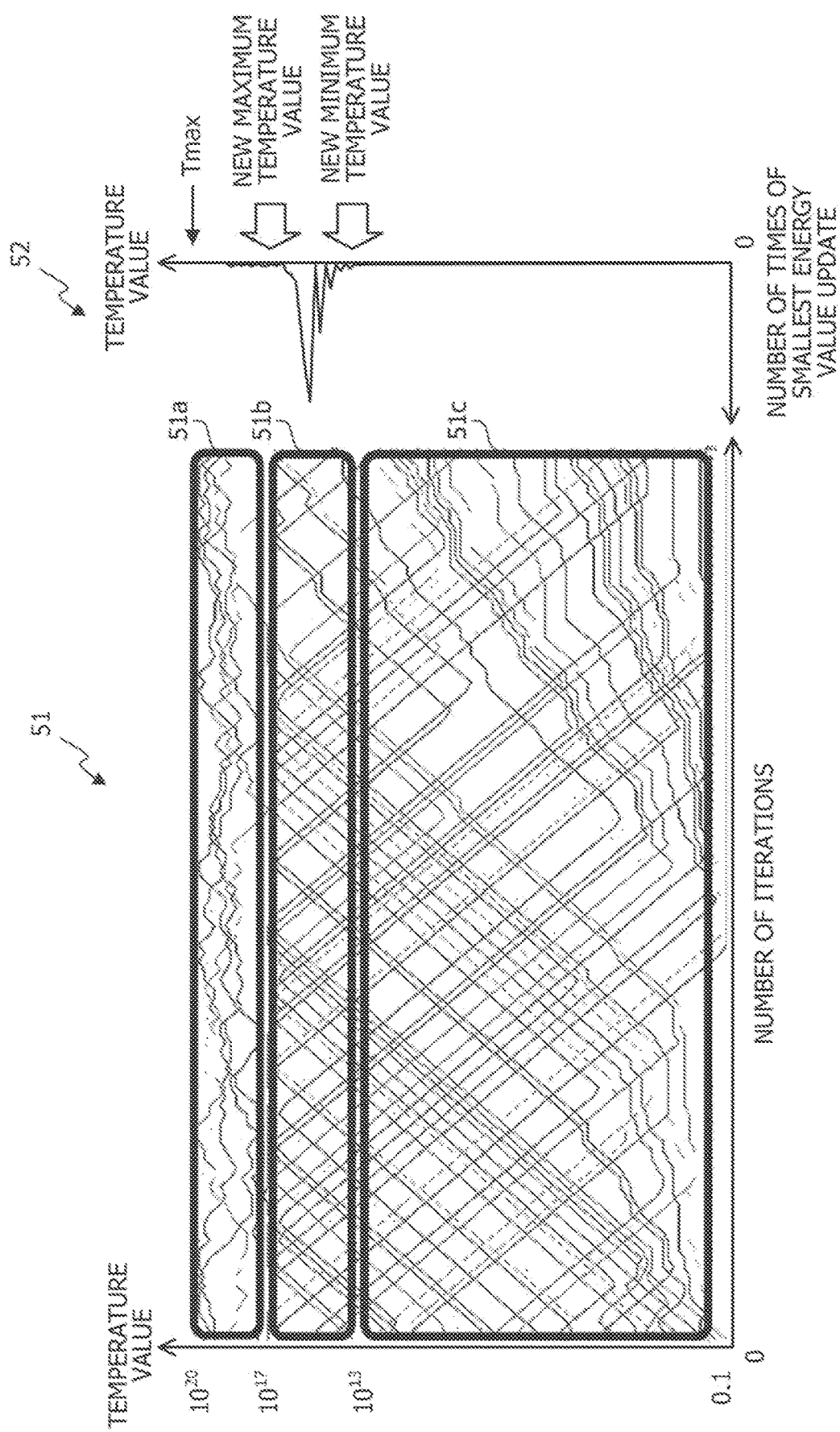
FIG. 2 illustrates a first example of determination of a temperature value.

FIG. 2 illustrates a first example of determination of a temperature value.

A graph 51 illustrates an example of a relationship between the number of iterations and the temperature value of each replica in a case of using the replica exchange method in a problem in which a coefficient is scaled. In the problem in which a coefficient is scaled, since the weight coefficient W of formula (1) has a relatively large value, the value of the energy function also becomes relatively large. Therefore, temperature values used for a search become relatively large values accordingly.

One iteration corresponds to one state transition in each replica. The horizontal axis of the graph 51 is the number of iterations. The vertical axis of the graph 51 is the temperature value set for replicas. The number N of replicas is about 40. One series in the graph 51 corresponds to one replica. A temperature value Tmax is the maximum temperature value used for the search illustrated in the graph 51. The minimum temperature value in the search is 0.1. A portion in the graph 51 where the temperature value for replicas changes corresponds to a timing at which replica exchange is performed.

A graph 52 represents the number of times of smallest energy value update at each temperature value, the update being observed in the search illustrated in the graph 51. The horizontal axis of the graph 52 is the number of times of smallest energy value update. The vertical axis of the graph 52 is the temperature value.

When focusing on the number of times of smallest energy value update from the high temperature side in the graphs 51 and 52, the smallest energy value Emin is hardly updated in a high temperature zone 51a close to the maximum temperature value Tmax. In an intermediate temperature zone 51b which is a temperature zone lower than the high temperature zone 51a, the smallest energy value Emin is relatively frequently updated. In the graph 51, in a case where the temperature value set for a certain replica continuously decreases for a relatively long period, the smallest energy value Emin is often updated at a time point at which the temperature value set starts to decrease in the period. In a low temperature zone 51c which is a temperature zone lower than the intermediate temperature zone 51b, the smallest energy value Emin is hardly updated.

Based on the information in the graph 52, the temperature adjustment unit 1b specifies two or more temperature values at which the number of times the smallest energy value Emin has been updated is larger than a threshold among the temperature values used for the search. The threshold may be 0 or more. The temperature adjustment unit 1b sets the largest value among the two or more temperature values as a new maximum temperature value, and sets the smallest value among the two or more temperature values as a new minimum temperature value.

As a result, a temperature value in the vicinity of the maximum temperature value in the intermediate temperature zone 51b in which the smallest energy value Emin is relatively frequently updated is determined as a new maximum temperature value. A temperature value in the vicinity of the minimum temperature value in the intermediate temperature zone 51b is determined as a new minimum temperature value. The new maximum temperature value and the new minimum temperature value are examples of the second temperature value.

Figure 3:
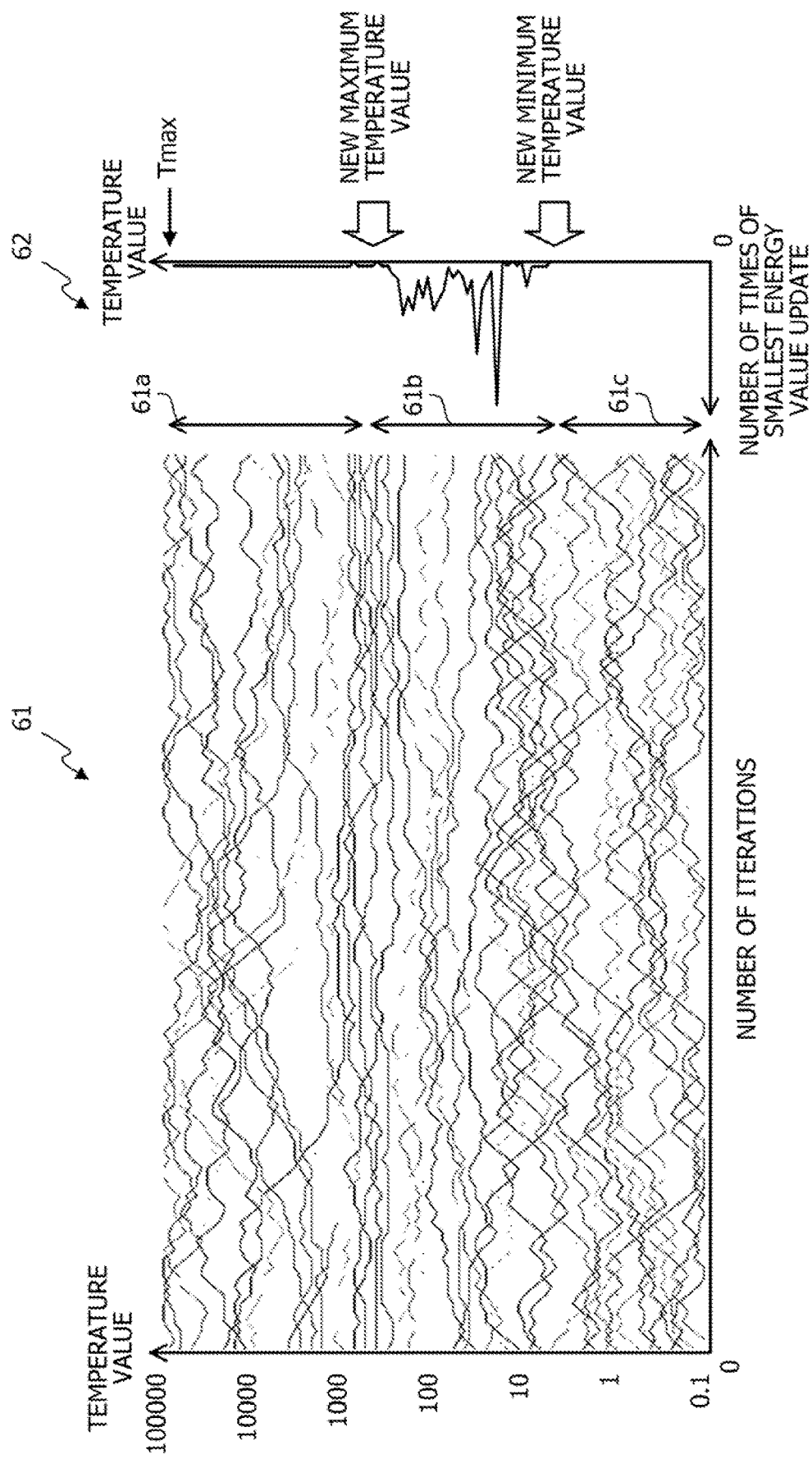
FIG. 3 illustrates a second example of determination of a temperature value.

FIG. 3 illustrates a second example of determination of a temperature value.

A graph 61 illustrates an example of a relationship between the number of iterations and the temperature value of each replica in a case of using the replica exchange method in a molecular similarity problem. In the molecular similarity problem, temperature values used for a search are smaller than those used in the problem in which a coefficient is scaled.

The horizontal axis of the graph 61 is the number of iterations. The vertical axis of the graph 61 is the temperature value set for replicas. The number N of replicas is about 40. One series in the graph 61 corresponds to one replica. A temperature value Tmax is the maximum temperature value used for the search illustrated in the graph 61. The minimum temperature value in the search is 0.1. A portion in the graph 61 where the temperature value for replicas changes corresponds to a timing at which replica exchange is performed.

A graph 62 represents the number of times of smallest energy value update at each temperature value, the update being observed in the search illustrated in the graph 61. The horizontal axis of the graph 62 is the number of times of smallest energy value update. The vertical axis of the graph 62 is the temperature value.

When focusing on the number of times of smallest energy value update from the high temperature side in the graphs 61 and 62, the smallest energy value Emin is hardly updated in a high temperature zone 61a close to the maximum temperature value Tmax. In an intermediate temperature zone 61b which is a temperature zone lower than the high temperature zone 61a, the smallest energy value Emin is relatively frequently updated. In a low temperature zone 61c which is a temperature zone lower than the intermediate temperature zone 61b, the smallest energy value Emin is hardly updated.

Based on the information in the graph 62, the temperature adjustment unit 1b specifies two or more temperature values at which the number of times the smallest energy value Emin has been updated is larger than a threshold among the temperature values used for the search. The threshold may be 0 or more. The temperature adjustment unit 1b sets the largest value among the two or more temperature values as a new maximum temperature value, and sets the smallest value among the two or more temperature values as a new minimum temperature value.

As a result, a temperature value in the vicinity of the maximum temperature value in the intermediate temperature zone 61b in which the smallest energy value Emin is relatively frequently updated is determined as a new maximum temperature value. A temperature value in the vicinity of the minimum temperature value in the intermediate temperature zone 61b is determined as a new minimum temperature value. The new maximum temperature value and the new minimum temperature value are examples of the second temperature value.

In this manner, even in a case of using the replica exchange method, temperature values may be appropriately determined in accordance with a problem. For example, by narrowing down the range of temperature values to the intermediate temperature zone 51b or the intermediate temperature zone 61b, each temperature value belonging to the intermediate temperature zone may be set for each replica such that the difference between adjacent temperature values becomes smaller. Therefore, the exchange probability based on formula (4) increases, and state transition in each replica may be further facilitated. As a result, the probability of reaching an optimal solution increases, and the solution performance may be improved.

It is also considered that the temperature adjustment unit 1b determines a new maximum temperature value and a new minimum temperature value by specifying the first temperature value used to determine the second temperature value based on a statistical value of the first temperature values at which the smallest energy value has been updated. For example, the temperature adjustment unit 1b may obtain, as the statistical value, an average value p and a standard deviation $\sigma$ of the first temperature values with respect to the number of times of smallest energy value update. The $\mu$ and the $\sigma$ are obtained by approximating the histograms illustrated in the graph 52 and the graph 62 with a normal distribution. For example, it is considered that the temperature adjustment unit 1b sets the first temperature value in the vicinity of the temperature value $\mu+A*\sigma$ as a new maximum temperature value. For example, it is also considered that the temperature adjustment unit 1b sets the first temperature value in the vicinity of the temperature value $\mu-B*\sigma$ as a new minimum temperature value. A and B are positive real numbers. Also in this manner, the temperature adjustment unit 1b may appropriately acquire temperature values according to a problem.

Second Embodiment

Next, a second embodiment will be described.

Figure 4:
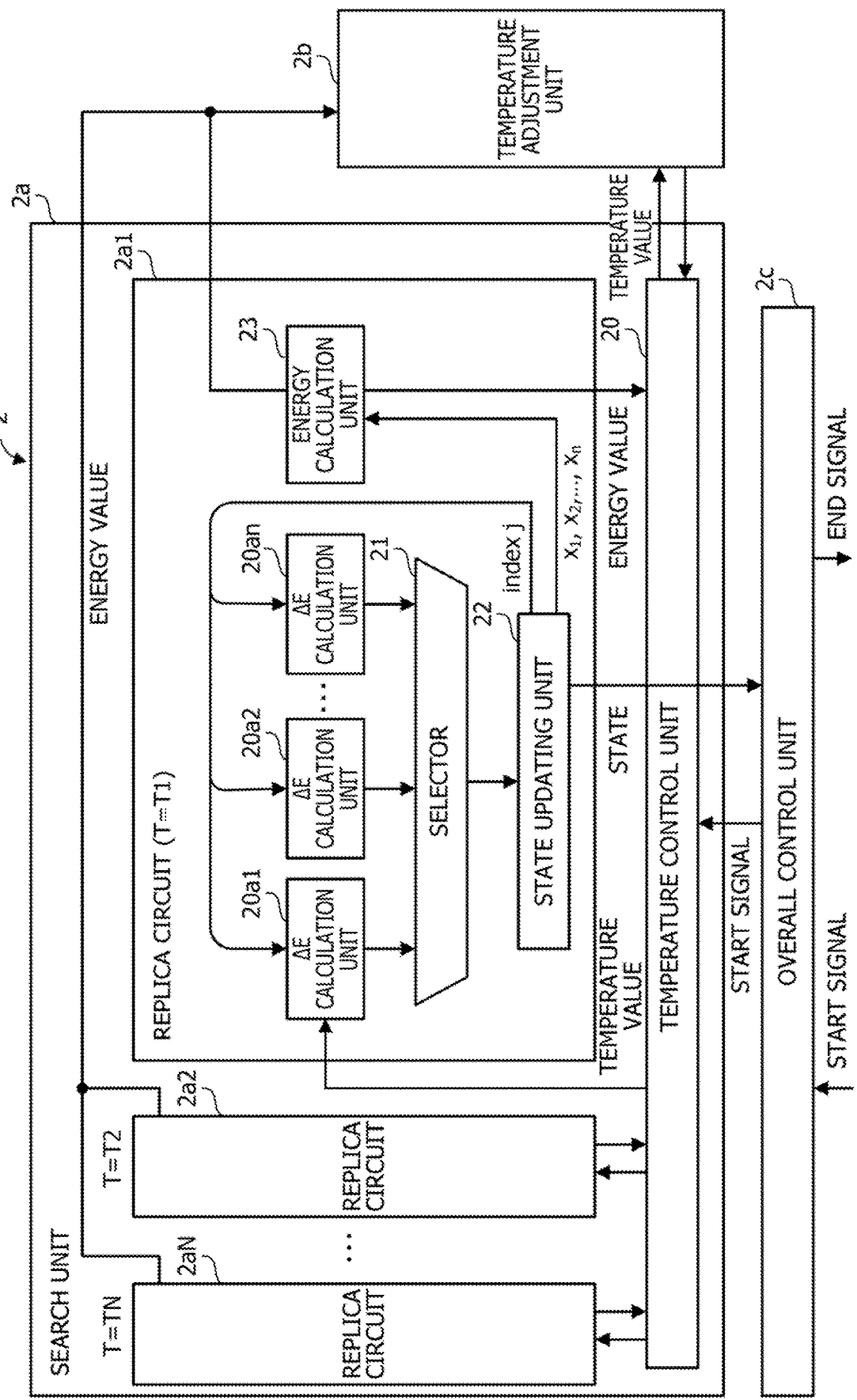
FIG. 4 illustrates an example of an information processing apparatus according to a second embodiment.

FIG. 4 illustrates an example of an information processing apparatus according to the second embodiment.

Using the replica exchange method, an information processing apparatus 2 searches the combinations of the respective values of a plurality of bits corresponding to a plurality of spins included in an Ising model, obtained through conversion performed on an optimization problem of a calculation target, for a value of each bit obtained when the energy function has the smallest value. A combination of the values of the plurality of bits corresponds to a state of the Ising model, and a combination in which the energy function has the smallest value corresponds to the ground state of the Ising model. In the following description, a state of an Ising model may be simply referred to as a state. The Ising-type energy function E(x) is defined by the above-described formula (1). The information processing apparatus 2 may also be referred to as an Ising machine, an optimization apparatus, or the like.

The information processing apparatus 2 is realized by using, for example, a semiconductor integrated circuit such as an FPGA. The information processing apparatus 2 includes a search unit 2a, a temperature adjustment unit 2b, and an overall control unit 2c. The search circuit, the temperature adjustment circuit, and an overall control circuit realized by using the semiconductor integrated circuit function as the search unit 2a, the temperature adjustment unit 2b, and the overall control unit 2c, respectively. However, the overall control unit 2c may be realized by a central processing unit (CPU) included in the information processing apparatus 2. For example, the overall control unit 2c may be realized by the CPU executing a program stored in a random-access memory (RAM) included in the information processing apparatus 2. The search unit 2a is an example of the search unit 1a of the first embodiment. The temperature adjustment unit 2b is an example of the temperature adjustment unit 1b of the first embodiment.

The search unit 2a performs a search for the ground state by the replica exchange method using a plurality of replica circuits. The search unit 2a includes replica circuits 2a1, 2a2, . . . , 2aN and a temperature control unit 20. The replica circuits 2a1 to 2aN are examples of replicas exemplified in the first embodiment. N is an integer of 2 or more and indicates the number of replica circuits.

Temperature values T1 to TN different from each other are set for the replica circuits 2a1 to 2aN. The temperature values T1 to TN are determined, for example, based on formulae (2) and (3) using a minimum temperature value tmp_min and a maximum temperature value tmp_max given in advance. Each of the replica circuits 2a1 to 2aN realizes a ground state search based on an Ising-type evaluation function represented by formula (1) by such a circuit as described below. Description will be made below focusing on the replica circuit 2a1, and the replica circuits 2a2 to 2aN have the similar circuit configuration.

The replica circuit 2a1 includes ΔE calculation units 20a1, 20a2, . . . , 20an, a selector 21, a state updating unit 22, and an energy calculation unit 23. n is an Integer of 2 or more and indicates the total number of bits in the replica circuit 2a1. In one example, n=1024, n=8192, or the like.

Each of the ΔE calculation units 20a1 to 20an corresponds to one bit, and in response to a change of any bit, calculates an energy change amount of a case where the own bit changes next, based on the weight coefficient of the changed bit and the own bit. Each of the ΔE calculation units 20a1 to 20an outputs, to the selector 21, a flag indicating whether to allow the own bit to be changed next, according to the comparison between the calculated energy change amount and a noise value. The noise value is obtained based on a temperature value or a random number. As the temperature value increases, the amplitude of the noise value increases. Thus, each of the ΔE calculation units 20a1 to 20an determines whether to allow the own bit to be changed next based on the Metropolis method or the Gibbs method.

Based on the flag received from each of the ΔE calculation units 20a1 to 20an, the selector 21 selects a bit to be changed next from bits that are allowed to be changed next. For example, the selector 21 uses a random number to select a bit to be changed next from bits that are allowed to be changed next. The selector 21 outputs an index j of the selected bit to the state updating unit 22.

The state updating unit 22 holds a plurality of bits, for example, states. Among the held states, the state updating unit 22 updates a state by inverting the bit corresponding to the index j received from the selector 21.

The state updating unit 22 outputs the index j to the ΔE calculation units 20a1 to 20an. The state updating unit 22 outputs the current state, for example, bit strings $x_1$, $x_2$, . . . , $x_n$, to the energy calculation unit 23. The state updating unit 22 outputs a state to the overall control unit 2c.

Based on the state received from the state updating unit 22 and the energy function, the energy calculation unit 23 calculates an energy value corresponding to the state. The energy calculation unit 23 outputs the energy value calculated for the state to the temperature control unit 20 and the temperature adjustment unit 2b. The energy calculation unit 23 may hold the smallest energy value obtained at the current temperature value and output the smallest energy value obtained at the current temperature value to the temperature adjustment unit 2b.

The temperature control unit 20 sets different temperature values T1 to TN for the replica circuits 2a1 to 2aN, respectively. The temperature control unit 20 manages the temperature value of each replica circuit by holding, in a register in the temperature control unit 20, first correspondence information in which the index of the replica is associated with the index of the temperature value and second correspondence Information in which the index of the temperature value is associated with the temperature value. When updating the temperature value, the temperature control unit 20 updates the temperature value in the second correspondence information. For example, in the second correspondence information, the temperature values are associated in ascending order with the indexes of the temperature values in ascending order. The index of the replica may be referred to as a replica number, and the index of the temperature value may be referred to as a temperature index.

In an initial predetermined period of the entire search period, the temperature control unit 20 calculates initial temperature values T1 to TN based on formulae (2) and (3) using a minimum temperature value tmp_min and a maximum temperature value tmp_max given in advance, and uses the initial temperature values T1 to TN. The minimum temperature value given initially is a relatively low temperature value. The maximum temperature value given initially is a relatively high temperature value. The initial predetermined period of the search is a period for temperature adjustment, and is referred to as a temperature adjustment period.

The temperature control unit 20 causes the replica circuits 2a1 to 2aN to start searching in response to a start signal received from the overall control unit 2c. The temperature control unit 20 acquires the energy value obtained by each of the replica circuits 2a1 to 2aN after a predetermined number of iterations in each of the replica circuits 2a1 to 2aN or after a predetermined time elapses from the start of the search. Based on the exchange probability p corresponding to the acquired energy value, the temperature control unit 20 exchanges temperature values between a pair of two replica circuits for which adjacent temperature values are set. The exchange probability p is calculated by formula (4). The temperature control unit 20 may exchange states instead of temperature values. In this case, the replica number in the first correspondence information identifies each state.

The temperature control unit 20 outputs the temperature values T1 to TN to the temperature adjustment unit 2b. When the temperature adjustment period ends, the temperature control unit 20 acquires a new maximum temperature value tmp_max and a new minimum temperature value tmp_min from the temperature adjustment unit 2b. The temperature control unit 20 calculates new temperature values T1 to TN based on formulae (2) and (3) by using the new maximum temperature value tmp_max and the new minimum temperature value tmp_min. The temperature control unit 20 sets the new temperature values T1 to TN in the replica circuits 2a1 to 2aN, and starts the search after the temperature adjustment period.

In the temperature adjustment period, the temperature adjustment unit 2b acquires the energy value reached at the current temperature value from each replica circuit for each timing of replica exchange, and determines whether the energy value is smaller than the previous smallest energy value in the corresponding replica circuit. In a case where the energy value obtained in a certain replica circuit is smaller than the previous smallest energy value in the replica circuit, the temperature adjustment unit 2b increments the number of times of smallest energy value update for the temperature value used in the previous search by the replica circuit.

When the temperature adjustment period ends, the temperature adjustment unit 2b updates the maximum temperature value tmp_max and the minimum temperature value tmp_min based on the number of times of smallest energy value update for each temperature value. The temperature adjustment unit 2b outputs the new maximum temperature value tmp_max and the new minimum temperature value tmp_min to the temperature control unit 20.

When receiving a start signal for instructing start of a search from the outside, the overall control unit 2c outputs the start signal to the temperature control unit 20.

When the entire period of the search by the replica circuits 2a1 to 2aN ends, the overall control unit 2c acquires the state held by each of the replica circuits 2a1 to 2aN. For example, the overall control unit 2c acquires a state corresponding to the smallest energy value reached by each of the replica circuits 2a1 to 2aN from each of the replica circuits 2a1 to 2aN.

The overall control unit 2c outputs an end signal to the outside. For example, the end signal includes states finally acquired respectively from the replica circuits 2a1 to 2aN or the state corresponding to the smallest energy value among the states. The overall control unit 2c may cause a display device coupled to the information processing apparatus 2 to display the information on the states or may transmit the information on the states to another computer coupled to the information processing apparatus 2 via a network.

Figure 5:
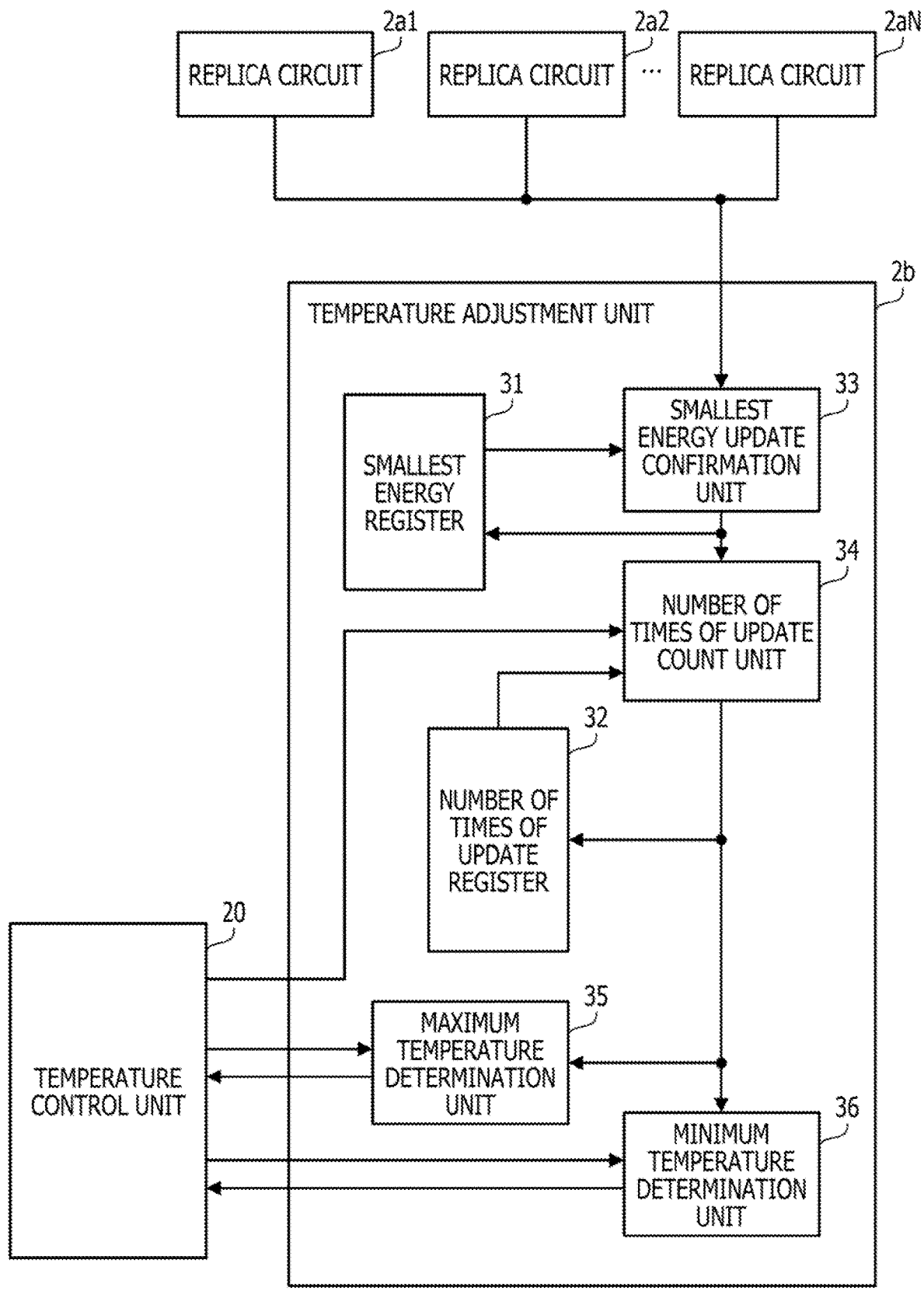
FIG. 5 illustrates an example of a temperature adjustment unit.

FIG. 5 illustrates an example of the temperature adjustment unit.

The temperature adjustment unit 2b includes a smallest energy register 31, a number of times of update register 32, a smallest energy update confirmation unit 33, a number of times of update count unit 34, a maximum temperature determination unit 35, and a minimum temperature determination unit 36. The smallest energy register 31 and the number of times of update register 32 are examples of the storage unit 1c of the first embodiment.

The smallest energy register 31 holds the smallest energy value obtained by each of the replica circuits 2a1 to 2aN.

The number of times of update register 32 holds the number of times of smallest energy value update for each of the temperature values T1 to TN.

The smallest energy update confirmation unit 33 acquires, from each of the replica circuits 2a1 to 2aN, the energy value E corresponding to the state obtained by the search at the current temperature value. The smallest energy update confirmation unit 33 compares the acquired energy value E with the previous smallest energy value Emin of the replica circuit stored in the smallest energy register 31. In a case of E<Emin, the smallest energy update confirmation unit 33 notifies the number of times of update count unit 34 that the smallest energy value has been updated in the corresponding replica circuit, and updates Emin of the replica circuit held in the smallest energy register 31 to E. In a case of E≥Emin, the smallest energy update confirmation unit 33 notifies the number of times of update count unit 34 that the smallest energy value has not been updated for the corresponding replica circuit.

When receiving a notification that the smallest energy value has been updated in a certain replica circuit, the number of times of update count unit 34 specifies the temperature index corresponding to the temperature value set for the corresponding replica circuit. For example, the number of times of update count unit 34 acquires the temperature index set for the corresponding replica circuit from the temperature control unit 20. The number of times of update count unit 34 increments the number of times of update corresponding to the corresponding temperature index held in the number of times of update register 32. The number of times of update count unit 34 outputs the number of times of update counted for each temperature index to the maximum temperature determination unit 35 and the minimum temperature determination unit 36.

The maximum temperature determination unit 35 acquires a temperature value corresponding to a temperature index from the temperature control unit 20. The maximum temperature determination unit 35 determines a new maximum temperature value based on the number of times of update corresponding to each temperature index, and outputs the determined maximum temperature value to the temperature control unit 20.

The minimum temperature determination unit 36 acquires a temperature value corresponding to a temperature index from the temperature control unit 20. The minimum temperature determination unit 36 determines a new minimum temperature value based on the number of times of update corresponding to each temperature index, and outputs the determined minimum temperature value to the temperature control unit 20.

Figure 6:
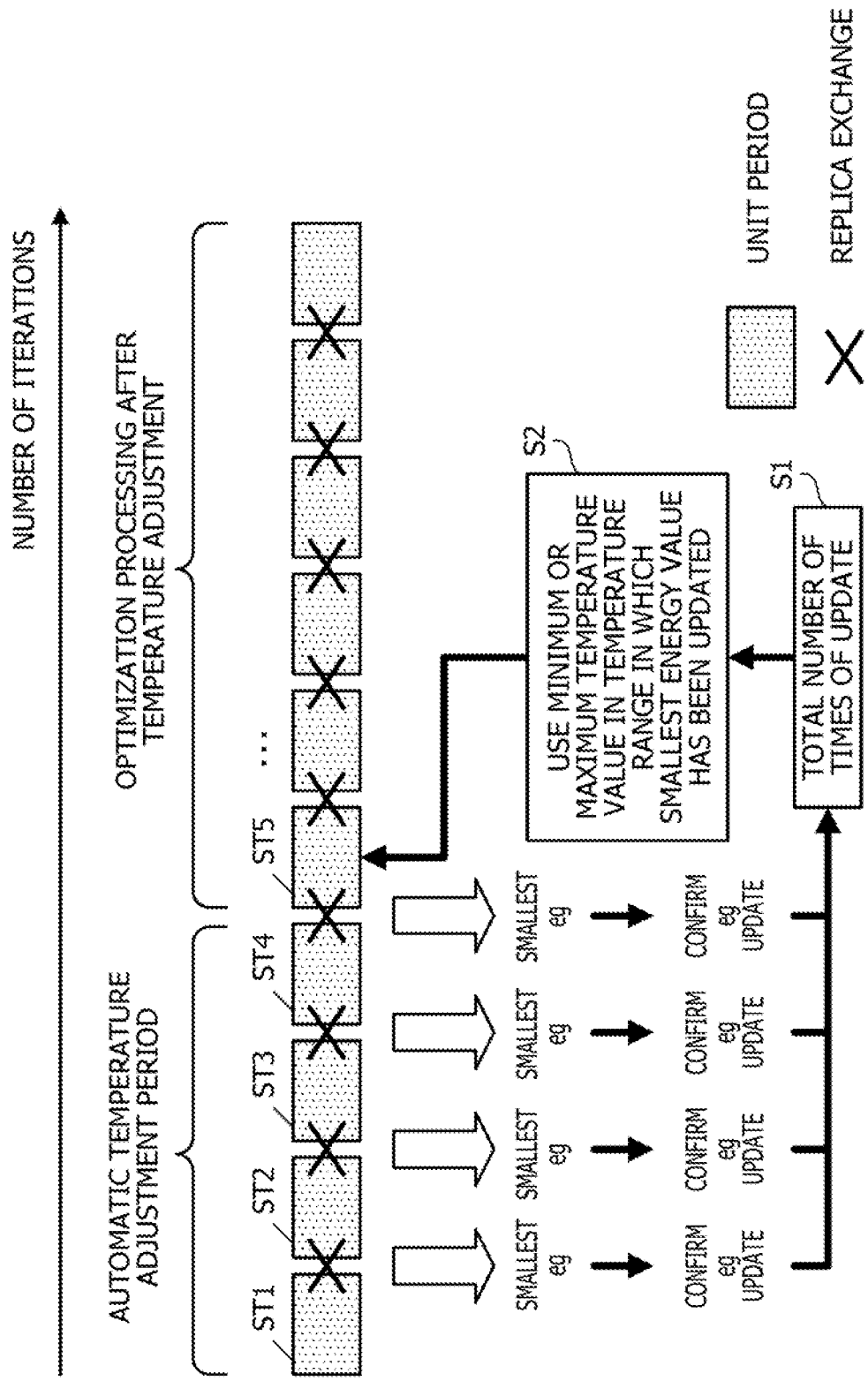
FIG. 6 illustrates an example of temperature value adjustment.

FIG. 6 illustrates an example of temperature value adjustment.

The horizontal axis in FIG. 6 indicates the number of iterations. Each of unit periods ST1, ST2, ST3, ST4, ST5, . . . is one unit of a search period in which a search is performed at a certain temperature value by the replica circuits 2a1 to 2aN. The unit period is defined as a predetermined number of iterations or a predetermined time interval. Replica exchange is performed in a time zone between the end time of a certain unit period and the start time of the next unit period. At this time, the state reached in the previous unit period is held in the corresponding replica circuit, and is taken over to the search in the next unit period. In the example of FIG. 6, a period including the unit periods ST1 to ST4 in the entire search period is an automatic temperature adjustment period. A period from and after the unit period ST5 is a period in which a stochastic search after temperature adjustment, for example, optimization processing, is performed. In FIG. 6, the energy value may be abbreviated as "eg".

In this case, at a time immediately after each of the unit periods ST1, ST2, ST3, ST4 ends, the smallest energy update confirmation unit 33 acquires, for example, the smallest energy value in the search at the current temperature value from each replica circuit. The smallest energy update confirmation unit 33 confirms, for each replica circuit, whether the acquired smallest energy value is smaller than the previous smallest energy value, for example, whether the previous smallest energy value has been updated. However, the smallest energy update confirmation unit 33 may acquire an energy value corresponding to the state held in the corresponding replica circuit when the unit period ends, compare the energy value with the previous smallest energy value, and determine whether the smallest energy value has been updated.

The smallest energy update confirmation unit 33 outputs, to the number of times of update count unit 34, identification information indicating that an update has occurred for the replica number of the replica circuit for which the smallest energy value has been updated. The number of times of update count unit 34 totals the number of times of update for each temperature value of each replica circuit (step S1). The totaling of the number of times of update is performed at a timing when each of the unit periods ST1, ST2, ST3, and ST4 ends, and the number of times of update at each temperature value over the unit periods ST1, ST2, ST3, and ST4 is counted.

The maximum temperature determination unit 35 and the minimum temperature determination unit 36 acquire the update count at each temperature value from the number of times of update count unit 34, and determine new temperature values by using the minimum or maximum temperature value in the temperature range in which the smallest energy value has been updated (step S2). The maximum temperature determination unit 35 determines a maximum temperature value among the new temperature values and outputs the maximum temperature value to the temperature control unit 20. The minimum temperature determination unit 36 determines a minimum temperature value among the new temperature values and outputs the minimum temperature value to the temperature control unit 20.

The temperature control unit 20 determines N temperature values to be used in the optimization processing from and after the unit period ST5 by formulae (2) and (3) using the new maximum temperature value and the new minimum temperature value. Thus, temperature values associated with temperature indexes are updated in the second correspondence information held by the temperature control unit 20. The temperature control unit 20 outputs the new temperature values corresponding to the respective temperature indexes of the replica circuits 2a1 to 2aN to the replica circuits. The temperature control unit 20 starts optimization processing from and after the unit period ST5 by the replica circuits 2a1 to 2aN.

The number of unit periods included in the temperature adjustment period is four, but may be a different number. In FIG. 6, the temperature adjustment period is only an initial period of the entire period of the optimization processing, but the temperature adjustment period may be provided a plurality of times in the middle of the entire period. For example, the temperature adjustment period may be periodically provided.

Next, a specific example of processing by the temperature adjustment unit 2b will be described with a data structure.

Figure 7:
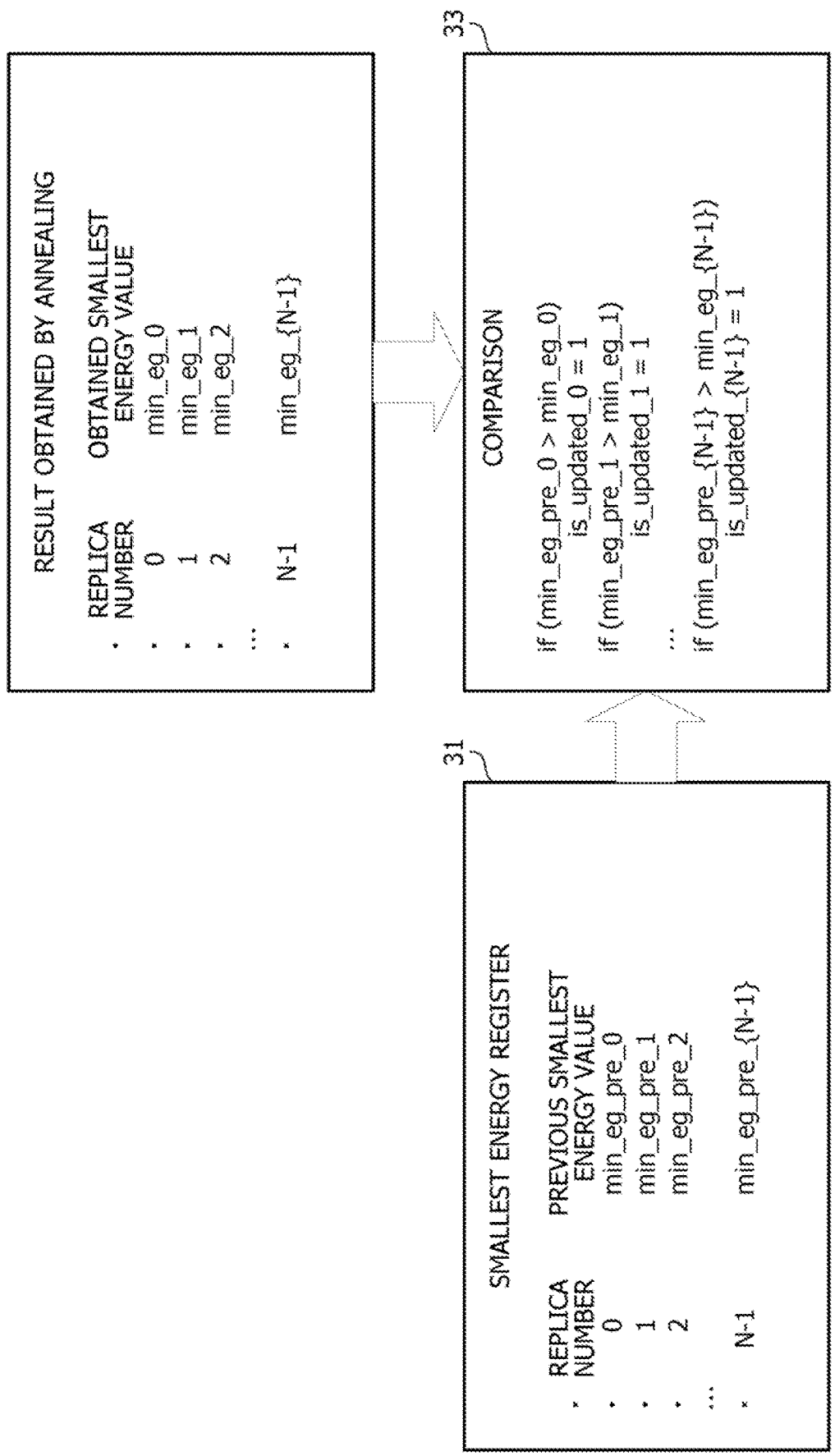
FIG. 7 illustrates an example of comparison of smallest energy values for each replica.

FIG. 7 illustrates an example of comparison of smallest energy values for each replica.

The smallest energy register 31 holds, in association with a replica number, the previous smallest energy value in the replica circuit of the corresponding replica number. For example, the smallest energy register 31 holds a smallest energy value min_eg_pre_i for a replica number i. An initial value of min_eg_pre_i is given in advance.

The smallest energy update confirmation unit 33 acquires the smallest energy value which is a result obtained by the search (annealing) at the current temperature value from each of the replica circuits 2a1 to 2aN. For example, the smallest energy value obtained in the replica circuit of the replica number i is min_eg_i.

The smallest energy update confirmation unit 33 compares min_eg_pre_i with min_eg_i for the replica number i.

In a case of min_eg_pre_i>min_eg_i, the smallest energy update confirmation unit 33 updates min_eg_pre_i held in the smallest energy register 31 to min_eg_i. The smallest energy update confirmation unit 33 outputs, to the number of times of update count unit 34, update flag is_updated_i=1 indicating that the smallest energy value has been updated. The update flag is_updated_i=1 is an example of identification information indicating that the smallest energy value is updated in the replica circuit of the replica number i. An initial value of update flag is_updated_i is 0. Update flag is_updated_i=0 indicates that the smallest energy value has not been updated.

In a case of min_eg_pre_i≤min_eg_i, the smallest energy update confirmation unit 33 outputs, to the number of times of update count unit 34, is_updated_i=0 for the replica number i, for example.

Figure 8:
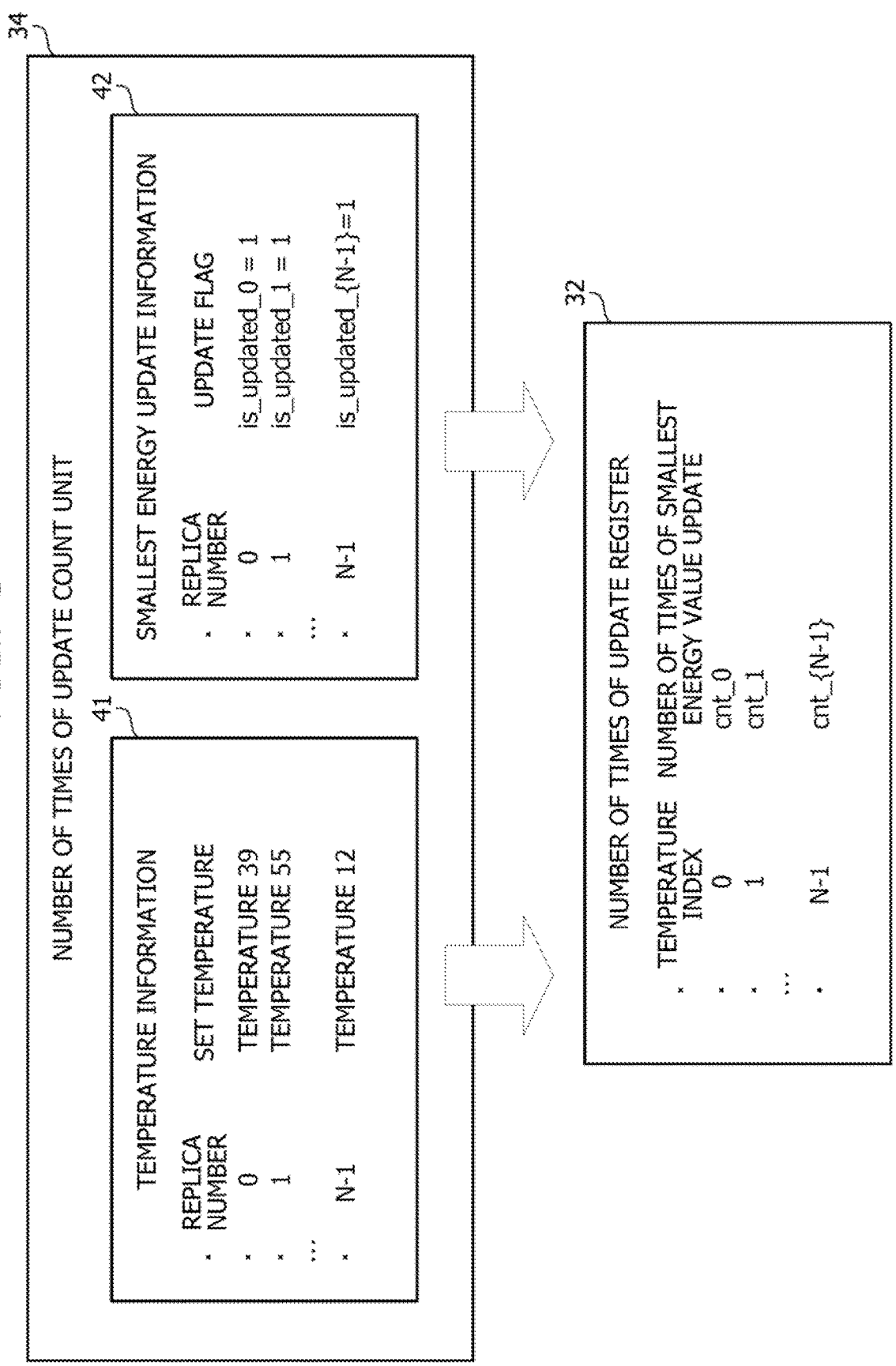
FIG. 8 illustrates an example of recording of the number of times of update for each temperature index.

FIG. 8 illustrates an example of recording of the number of times of update for each temperature index.

The number of times of update register 32 holds the number of times of smallest energy value update in association with a temperature index. For example, the number of times of smallest energy value update of a temperature index i is cnt_i. An initial value of cnt_i is 0.

The number of times of update count unit 34 acquires temperature information 41 from the temperature control unit 20. The temperature information 41 indicates a correspondence relationship between a replica number and a temperature index.

The number of times of update count unit 34 acquires smallest energy update information 42 from the smallest energy update confirmation unit 33. The smallest energy update information 42 is information on update flag for each replica number.

The number of times of update count unit 34 specifies a temperature index corresponding to a replica number based on the temperature information 41, and converts the replica number in the smallest energy update information 42 into the temperature index.

Regarding the number of times of smallest energy value update held in the number of times of update register 32, the number of times of update count unit 34 adds 1 to the number of times of smallest energy value update of the temperature index corresponding to the replica number whose update flag is "1".

The maximum temperature determination unit 35 and the minimum temperature determination unit 36 respectively determine a new maximum temperature value and a new minimum temperature value in accordance with a comparison between the number of times of smallest energy value update for each temperature index held in the number of times of update register 32 and a threshold. A value of 0 or more is set in advance for the threshold.

As an example, a case where the threshold=0 and ascending order of temperature value is ascending order of the temperature index i is considered.

In this case, the maximum temperature determination unit 35 determines, as the new maximum temperature value, a temperature value corresponding to the largest temperature index among temperature indexes satisfying cnt_i>0. The minimum temperature determination unit 36 determines, as the new minimum temperature value, a temperature value corresponding to the smallest temperature index among the temperature indexes satisfying cnt_i>0.

Alternatively, the maximum temperature determination unit 35 and the minimum temperature determination unit 36 may determine a new maximum temperature value and a new minimum temperature value based on a statistical value of temperature values with respect to the number of times of smallest energy value update in the number of times of update register 32. For example, the maximum temperature determination unit 35 and the minimum temperature determination unit 36 may obtain, as the statistical values, an average value p of the temperature values with respect to the number of times of smallest energy value update and a standard deviation a of the distribution of the number of times of smallest energy value update with respect to the temperature values.

It is considered that the maximum temperature determination unit sets a temperature value corresponding to a temperature index that is in the vicinity of the temperature value μ+A*σ as a new maximum temperature value. It is also considered that the minimum temperature determination unit 36 sets a temperature value corresponding to a temperature index that is in the vicinity of the temperature value μ−B*σ as a new minimum temperature value. A and B are both positive real numbers.

The number of times of update register 32 may record the update frequency of the smallest energy value instead of the number of times of smallest energy value update. For example, the number of times of update count unit 34 may record the update frequency per unit period by dividing the accumulated number of times of update in the unit periods ST1 to ST4 by the number "4" of unit periods.

Next, an example of a processing procedure of the information processing apparatus 2 will be described.

Figure 9:
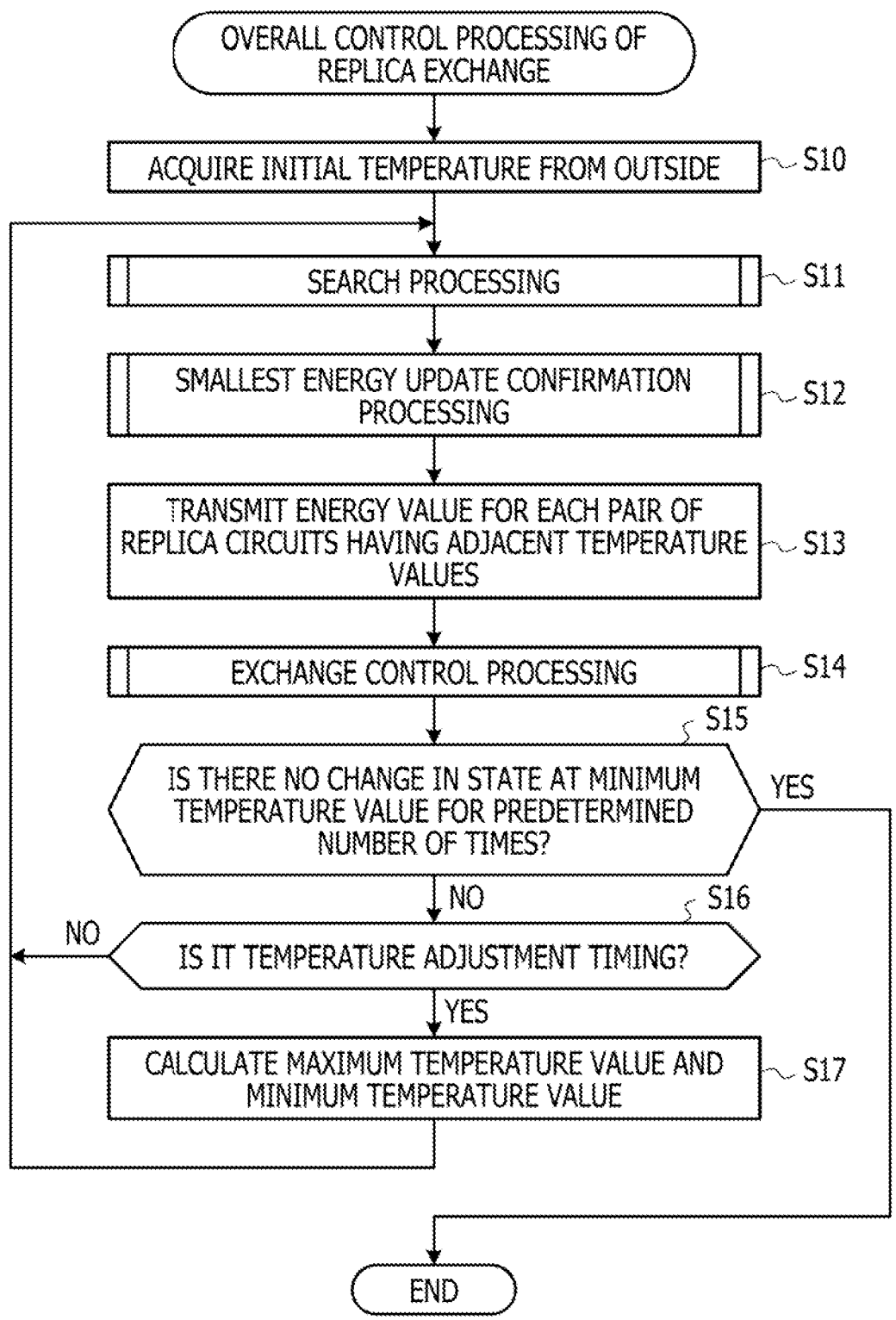
FIG. 9 is a flowchart illustrating an example of overall control processing of replica exchange.

FIG. 9 is a flowchart illustrating an example of overall control processing of replica exchange.

(S10) The overall control unit 2c acquires temperature information indicating initial temperature values as input data from the outside, and outputs a start signal together with the temperature information to the temperature control unit 20.

(S11) The temperature control unit 20 receives the start signal from the overall control unit 2c, sets initial temperature values T1 to TN different from each other in the replica circuits 2a1 to 2aN, respectively, and causes the replica circuits to execute a stochastic search. Details of the search processing by each of the replica circuits 2a1 to 2aN will be described later.

(S12) When the search by each of the replica circuits 2a1 to 2aN for a unit period is completed, the temperature adjustment unit 2b performs smallest energy update confirmation processing, including acquisition of an energy value obtained in the immediately preceding unit period, for each of the replica circuits 2a1 to 2aN. Details of the smallest energy update confirmation processing will be described later.

(S13) The replica circuits 2a1 to 2aN transmit, to the temperature control unit 20, the energy value for each pair of replica circuits having adjacent temperature values, for example, having adjacent temperature indexes. The temperature control unit 20 acquires the energy values calculated by the replica circuits 2a1 to 2aN for each pair of replica circuits having adjacent temperature values.

(S14) The temperature control unit 20 calculates an exchange probability based on formula (4), and performs exchange control processing of temperature values based on the exchange probability. The temperature control unit 20 performs exchange control processing on temperature values for each pair of replica circuits having adjacent temperature values. Details of the exchange control processing will be described later.

(S15) The replica circuits 2a1 to 2aN determine whether the state of the replica circuit having the minimum temperature value does not change even after replica exchange is performed a predetermined number of times. When there is no change in the state of the replica circuit having the minimum temperature value, the replica circuits 2a1 to 2aN output the states to the overall control unit 2c, and end the overall control processing of replica exchange. In a case where there is a change in the bit state of the replica circuit having the minimum temperature value, the replica circuits 2a1 to 2aN advances the processing to step S16.

(S16) The temperature control unit 20 determines whether it is a temperature adjustment timing. In a case where it is the temperature adjustment timing, the temperature control unit 20 advances the processing to step S17, and causes the temperature adjustment unit 2b to execute temperature adjustment. In a case where it is not the temperature adjustment timing, the temperature control unit 20 advances the processing to step S11, and causes the replica circuits 2a1 to 2aN to continue the stochastic search. As exemplified in FIG. 11, the temperature adjustment timing may be a timing at which a predetermined number of unit periods at the beginning of the entire iteration period are completed. The temperature adjustment timing may be provided a plurality of times in the entire iteration period, or may be a periodic timing.

(S17) The temperature adjustment unit 2b calculates a new maximum temperature value and a new minimum temperature value based on the number of times of smallest energy value update at each temperature value recorded in the number of times of update register 32. The temperature adjustment unit 2b outputs the calculated maximum temperature value and minimum temperature value to the temperature control unit 20. The temperature control unit 20 calculates N temperature values based on formulae (2) and (3) by using the new maximum temperature value and the new minimum temperature value. The temperature control unit 20 sets the calculated N temperature values for the replica circuits 2a1 to 2aN, respectively. The temperature control unit 20 advances the processing to step S11, and causes the replica circuits 2a1 to 2aN to continue the stochastic search.

When acquiring the states finally obtained from the replica circuits 2a1 to 2aN, the overall control unit 2c outputs an end signal to the outside. For example, the end signal includes states finally obtained respectively by the replica circuits 2a1 to 2aN or a state corresponding to the smallest energy value among the states. The overall control unit 2c may cause a display device coupled to the information processing apparatus 2 to display the information on the states or may transmit the information on the states to another computer coupled to the information processing apparatus 2 via a network.

Figure 10:
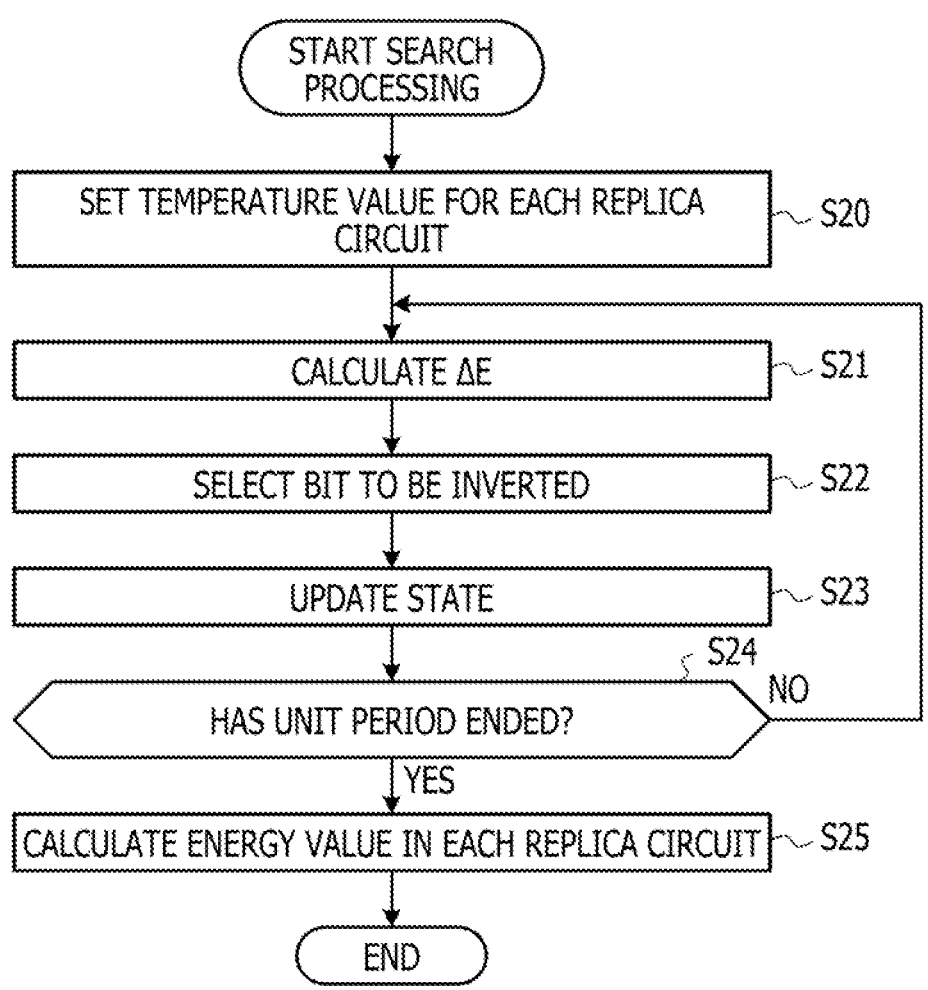
FIG. 10 is a flowchart illustrating an example of search processing.

FIG. 10 is a flowchart illustrating an example of search processing.

The search processing corresponds to step S11.

(S20) The temperature control unit 20 sets temperature values different from each other for the replica circuits 2a1 to 2aN. Initial temperature values set respectively for the replica circuits 2a1 to 2aN are determined in advance in accordance with a problem or the like. After the temperature values have been updated in step 517, the updated temperature values are set for the replica circuits 2a1 to 2aN.

(S21) Each of the replica circuits 2a1 to 2aN calculates an energy change amount $\Delta E$ for each bit.

(S22) Each of the replica circuits 2a1 to 2aN selects a bit to be inverted based on the energy change amount $\Delta E$ for each bit.

(S23) Each of the replica circuits 2a1 to 2aN updates the state by inverting the bit selected in step S22.

(S24) Each of the replica circuits 2a1 to 2aN determines whether the unit period has ended. In a case where the unit period has ended, each of the replica circuits 2a1 to 2aN advances the processing to step S25. In a case where the unit period has not ended, each of the replica circuits 2a1 to 2aN advances the processing to step S21. As described above, determination of whether the unit period has ended is made based on whether a predetermined number of iterations corresponding to the unit period has been reached or whether a predetermined time corresponding to the unit period has elapsed.

(S25) Each of the replica circuits 2a1 to 2aN calculates an energy value corresponding to the current state. Each of the replica circuits 2a1 to 2aN outputs the calculated energy value to the temperature control unit 20 and the temperature adjustment unit 2b, and ends the search processing.

In a case where the smallest energy value obtained by the search at the current temperature value is output to the temperature adjustment unit 2b, each of the replica circuits 2a1 to 2aN calculates an energy value in the current state immediately after step S23, and the holds the smallest energy value reached at the current temperature value. In step S25, each of the replica circuits 2a1 to 2aN outputs the smallest energy value obtained by the search at the current temperature value to the temperature adjustment unit 2b.

Figure 11:
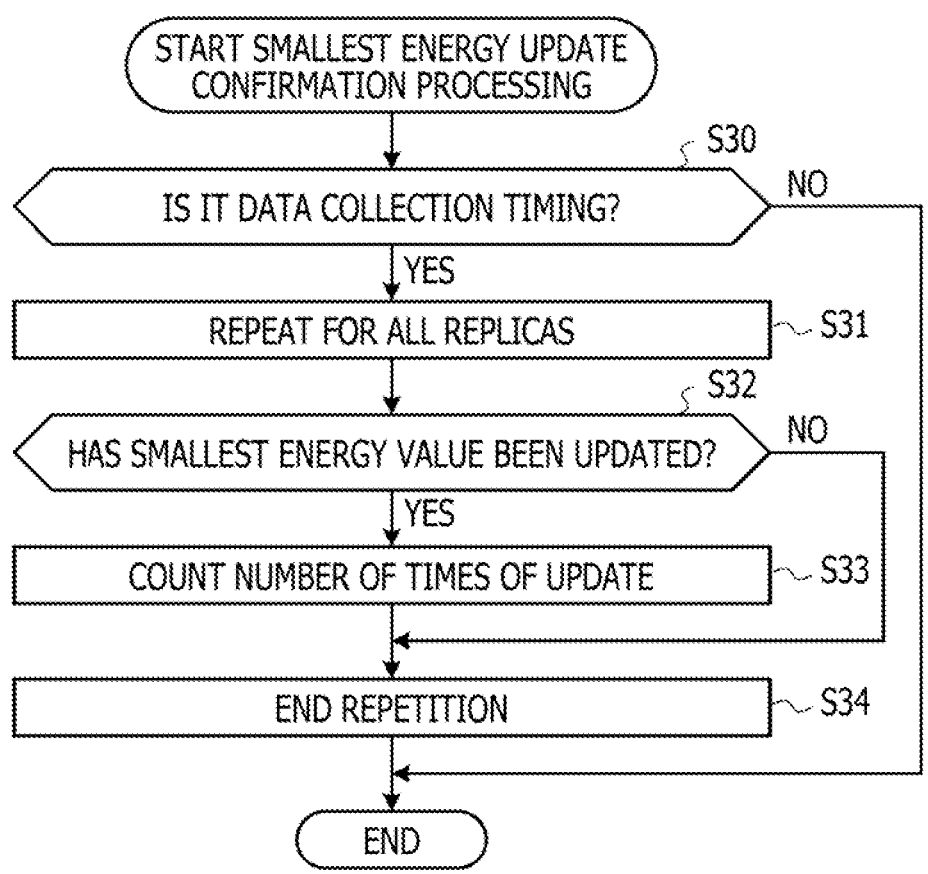
FIG. 11 is a flowchart illustrating an example of smallest energy update confirmation processing.

FIG. 11 is a flowchart illustrating an example of smallest energy update confirmation processing.

(S30) The smallest energy update confirmation unit 33 determines whether it is a data collection timing. In a case where it is the data collection timing, the smallest energy update confirmation unit 33 advances the processing to step S31. In a case where it is not the data collection timing, the smallest energy update confirmation unit 33 ends the smallest energy update confirmation processing. The data collection timing may be each timing at which the search processing of one unit period executed by the replica circuits 2a1 to 2aN in parallel is completed, or may be each timing at which the search processing of two or more unit periods is completed. The data collection timing is set in the temperature adjustment unit 2b in advance.

(S31) The smallest energy update confirmation unit 33 acquires, from each of the replica circuits 2a1 to 2aN, the energy value E corresponding to the state obtained by the search at the current temperature value. The smallest energy update confirmation unit 33 repeatedly executes steps S32 and S33 for all replicas, for example, all of the replica circuits 2a1 to 2aN.

(S32) For a corresponding replica circuit, the smallest energy update confirmation unit 33 compares the energy value E acquired this time with the smallest energy value Emin that has been previously obtained in the corresponding replica circuit. In a case of E<Emin, the smallest energy update confirmation unit 33 updates the smallest energy value Emin in the smallest energy register 31 to the energy value E acquired this time for the corresponding replica circuit. In a case of E_min, the smallest energy value Emin of the smallest energy register 31 is not updated for the corresponding replica circuit.

The smallest energy update confirmation unit 33 determines whether the smallest energy value Emin in the smallest energy register 31 has been updated for the corresponding replica circuit. In a case where the smallest energy value Emin has been updated, the smallest energy update confirmation unit 33 notifies the number of times of update count unit 34 that the smallest energy value Emin has been updated for the corresponding replica circuit, and advances the processing to step S33. In a case where the smallest energy value Emin has not been updated, the smallest energy update confirmation unit 33 notifies the number of times of update count unit 34 that the smallest energy value Emin has not been updated for the corresponding replica circuit, and the advances the processing to step S34.

(S33) When receiving a notification that the smallest energy value has been updated in the corresponding replica circuit, the number of times of update count unit 34 specifies the temperature index corresponding to the temperature value set for the corresponding replica circuit based on the temperature information 41. The number of times of update count unit 34 adds 1 to the number of times of smallest energy value update corresponding to the specified temperature index in the number of times of update register 32.

(S34) When the procedure including and after step S31 is executed for all replica circuits, the smallest energy update confirmation unit 33 ends the smallest energy update confirmation processing.

For the replica circuit of the replica number i, min_eg_i described in FIG. 7 is an example of the energy value E acquired in step S32. For the replica circuit of the replica number i, min_eg_pre_i described in FIG. 7 is an example of the smallest energy value Emin held in the smallest energy register 31 in step S32. For the replica circuit of the replica number i, the output of is_updated_i=1 described in FIG. 7 is an example of the notification that the smallest energy value Emin has been updated for the corresponding replica circuit in step S32. After the notification to the number of times of update count unit 34 has been performed, the smallest energy update confirmation unit 33 resets is_updated_i to 0.

Figure 12:
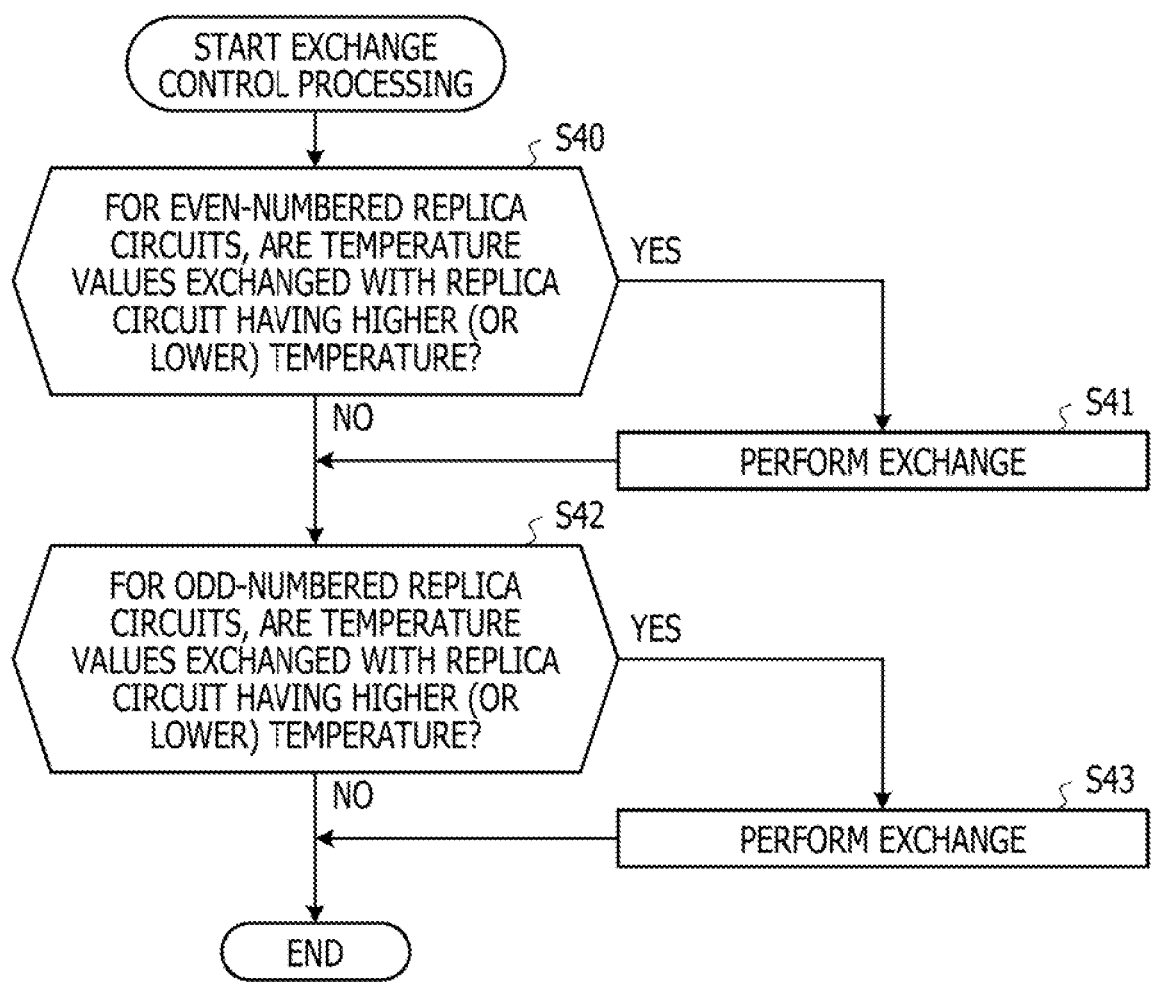
FIG. 12 is a flowchart illustrating an example of exchange control processing.

FIG. 12 is a flowchart illustrating an example of exchange control processing.

The exchange control processing corresponds to step S14.

(S40) For even-numbered replica circuits in ascending order (or descending order) of temperature values, the temperature control unit 20 determines whether to exchange temperature values with the replica circuit having the adjacent higher (or lower) temperature based on the exchange probability of formula (4). The determination of the exchange of temperature values is performed for each pair of replica circuits. In a case where there is a pair of replica circuits determined to exchange temperature values, the temperature control unit 20 advances the processing to step S41. In a case where there is no pair of replica circuits determined to exchange temperature values, the temperature control unit 20 advances the processing to step S42.

(S41) The temperature control unit 20 exchanges temperature values for the pair of replica circuits determined to exchange the temperature values in step S40.

(S42) For odd-numbered replica circuits in ascending order (or descending order) of temperature values, the temperature control unit 20 determines whether to exchange temperature values with the replica circuit having the adjacent higher (or lower) temperature based on the exchange probability of formula (4). The determination of the exchange of temperature values is performed for each pair of replica circuits. In a case where the temperature control unit 20 determines in step S40 for the even-numbered replica circuits whether to exchange temperature values with the replica circuit having the higher temperature, the temperature control unit 20 determines in step S42 for the odd-numbered replica circuits whether to exchange temperature values with the replica circuit having the higher temperature. In a case where the temperature control unit 20 determines in step S40 for the even-numbered replica circuits whether to exchange temperature values with the replica circuit having the lower temperature, the temperature control unit 20 determines in step S42 for the odd-numbered replica circuits whether to exchange temperature values with the replica circuit having the lower temperature. In a case where there is a pair of replica circuits determined to exchange temperature values, the temperature control unit 20 advances the processing to step S43. In a case where there is no pair of replica circuits determined to exchange temperature values, the temperature control unit 20 ends the exchange control processing.

(S43) The temperature control unit 20 exchanges temperature values for the pair of replica circuits determined to exchange the temperature values in step S42. The temperature control unit 20 ends the exchange control processing.

In the above example, exchange control of temperature values is performed by focusing on the odd-numbered replica circuits after the even-numbered replica circuits, but the temperature control unit 20 may perform exchange control of temperature values by focusing on the even-numbered replica circuits after the odd-numbered replica circuits. For example, the temperature control unit 20 may execute steps S40 and S41 after steps S42 and S43. As described above, the temperature control unit 20 may exchange states instead of temperature values.

According to the information processing apparatus 2, temperature values suitable for a problem may be acquired. For example, by determining a maximum temperature value and a minimum temperature value in the replica exchange method based on the number of times of smallest energy value update at each temperature value, appropriate temperature values may be set even in a problem of spin glass or a problem in which a coefficient is enlarged and scaled.

When temperature values are too high or too low, the smallest energy value may not be updated in a search by the search unit 2a. If the smallest energy value is not updated, it means that state transition does not progress in a direction in which the energy value decreases at the corresponding temperature value. Therefore, the information processing apparatus 2 determines new temperature values based on the result that the smallest energy value has been updated, and thus may exclude unwanted temperature values that do not contribute to facilitation of state transition in the direction in which the energy value decreases. In this manner, the information processing apparatus 2 may appropriately determine temperature values. Since the information processing apparatus 2 performs a search based on the determined new temperature values, a search using unwanted temperature values is no longer performed. With appropriate temperature values, state transition in a direction in which the energy value decreases may be facilitated. As a result, a solution may be efficiently obtained, and the solution performance of the information processing apparatus 2 may be improved.

In summary, the information processing apparatus 2 includes, for example, the following functions including the functions of the information processing apparatus 1 according to the first embodiment.

The search unit 2a performs a search for the ground state represented by a plurality of state variables included in the energy function by using a plurality of temperature values.

The temperature adjustment unit 2b acquires, from the search unit 2a, an energy value obtained for the plurality of state variables at the first temperature value among the plurality of temperature values. The temperature adjustment unit 2b determines whether the acquired energy value is smaller than the smallest energy value obtained for the plurality of state variables before reaching the first temperature value. In a case where the acquired energy value is smaller than the previous smallest energy value, the temperature adjustment unit 2b records update information indicating that the smallest energy value is updated at the first temperature value. The temperature adjustment unit 2b outputs the second temperature value based on the first temperature value at which update information is recorded among the plurality of temperature values.

Thus, temperature values suitable for a problem may be acquired. For example, based on the second temperature value, the search unit 2a or the temperature adjustment unit 2b may obtain new temperature values so as to omit temperature values with no result of update of the smallest energy value. By performing a search for the ground state with appropriate temperature values, the solution performance of the information processing apparatus 2 is improved.

The temperature adjustment unit 2b acquires, as the energy value acquired from the search unit 2a, the smallest energy value among the energy values obtained for the plurality of state variables during the search at the first temperature value.

Thus, it is possible to appropriately detect that a state below the previous smallest energy value is generated at the corresponding temperature value.

The search unit 2a performs a search using each of the first set and the second set of the plurality of state variables. A bit string held in the state updating unit (for example, the state updating unit 22) of one replica circuit is an example of one set of the plurality of state variables. However, the searches by the respective sets of the plurality of state variables may be executed in parallel or may be executed serially. The search unit 2a may perform a search by using each of three or more sets including the first set and the second set.

For example, the temperature adjustment unit 2b determines whether a first value of the energy function at the first temperature value for the first set is smaller than a first smallest value of the energy function obtained for the first set before reaching the first temperature value. In a case where the first value is smaller than the first smallest value, the temperature adjustment unit 2b records update information for the first temperature value.

The temperature adjustment unit 2b determines whether a second value of the energy function at the first temperature value for the second set Is smaller than a second smallest value of the energy function obtained for the second set before reaching the first temperature value. In a case where the second value is smaller than the second smallest value, the temperature adjustment unit 2b records update information for the first temperature value.

In this manner, by recording update information at each temperature value by using a plurality of sets of a plurality of state variables, it is possible to improve the accuracy of acquisition of update information for each temperature value.

In a case where the first value is smaller than the first smallest value, the temperature adjustment unit 2b updates the first smallest value held for the first set to the first value. In a case where the second value is smaller than the second smallest value, the temperature adjustment unit 2b updates the second smallest value held for the second set to the second value. The temperature adjustment unit 2b records, as update information, the number of times the first smallest value and the second smallest value are updated for each of a plurality of temperature values, and specifies a temperature value used to determine the second temperature value among the plurality of temperature values based on the number of times recorded for each of the plurality of temperature values.

Thus, statistical reliability for the determined temperature value may be increased.

For example, the second temperature value includes a new maximum temperature value and a new minimum temperature value used for a search for the ground state. The temperature adjustment unit 2b specifies two or more temperature values at which the recorded number of times is larger than a threshold among the plurality of temperature values. The temperature adjustment unit 2b determines the largest temperature value among the specified two or more temperature values as the maximum temperature value. The temperature adjustment unit 2b determines the smallest temperature value among the specified two or more temperature values as the minimum temperature value.

Thus, temperature values at which the smallest energy value is updated, but the number of times of update is relatively small may be excluded, and the range of new temperature values may be more appropriately narrowed down. By appropriately determining temperature values, the solution performance of the information processing apparatus 2 may be improved.

Alternatively, the temperature adjustment unit 2b may calculate a statistical value of temperature values at which the smallest energy value has been updated, from the number of times of smallest energy value update for each of the plurality of temperature values, and specify the first temperature value used to determine the second temperature value, based on the statistical value.

Thus, temperature values suitable for a problem may be acquired. By appropriately determining temperature values, the solution performance of the information processing apparatus 2 may be improved.

For example, the temperature adjustment unit 2b may obtain, as the statistical value, an average value p and a standard deviation a of the temperature values with respect to the number of times of smallest energy value update as described above. The temperature adjustment unit 2b may obtain, as the second temperature value, both or any one of the maximum temperature value and the minimum temperature value based on the first temperature value specified from the average value p and the standard deviation σ. For example, as described above, the temperature adjustment unit 2b may set the first temperature value closest to the temperature value $\mu+A*\sigma$ as the maximum temperature value, and set the first temperature value closest to the temperature value $\mu-B*\sigma$ as the minimum temperature value, among a plurality of first temperature values at which the number of times of update is recorded.

The search unit 2a executes the search by the first set and the search by the second set in parallel. For example, the search unit 2a may solve the same combinatorial optimization problem in parallel by the SA method by independently using each of the replica circuits 2a1 to 2aN without using the replica exchange method.

Thus, searches by respective sets improve the accuracy of acquisition of update information for each temperature value, and temperature values may be appropriately determined.

For example, in a case where searches by respective sets are performed in parallel, the search unit 2a may exchange a temperature value used in the search by the first set with another temperature value used in the search by the second set based on a predetermined exchange probability. For example, the search unit 2a may perform a search by the replica exchange method by using the replica circuits 2a1 to 2aN in parallel.

Thus, temperature values may be appropriately determined even when the replica exchange method is used.

Alternatively, the search unit 2a may start the search by the second set after the search by the first set using a plurality of temperature values is completed.

Thus, even in a case where the search unit 2a performs a search by using only one replica circuit, searches by respective sets improve the accuracy of acquisition of update information for each temperature value, and temperature values may be appropriately determined. For example, it is considered that the search unit 2a first performs the search by the first set and then performs the search by the second set by using one replica circuit, and records update information for each temperature value by the temperature adjustment unit 2b in the process of each search.

The temperature adjustment unit 2b outputs the determined second temperature value to the search unit 2a. The search unit 2a determines a plurality of other temperature values based on the second temperature value, and performs a search for the ground state corresponding to the energy function by using the determined plurality of other temperature values.

Thus, the solution performance of the information processing apparatus 2 may be improved. For example, a temperature value is adjusted based on a search result obtained in a partial period of the entire iteration period, and a search for the ground state is performed with the adjusted temperature value in a subsequent period. Thus, state transition in each replica circuit is facilitated, and a possibility of reaching an optimal solution within a certain period may be increased.

Third Embodiment

Next, a third embodiment will be described. Items different from the first and second embodiments described above will be mainly described, and descriptions of the common items will be omitted.

Figure 13:
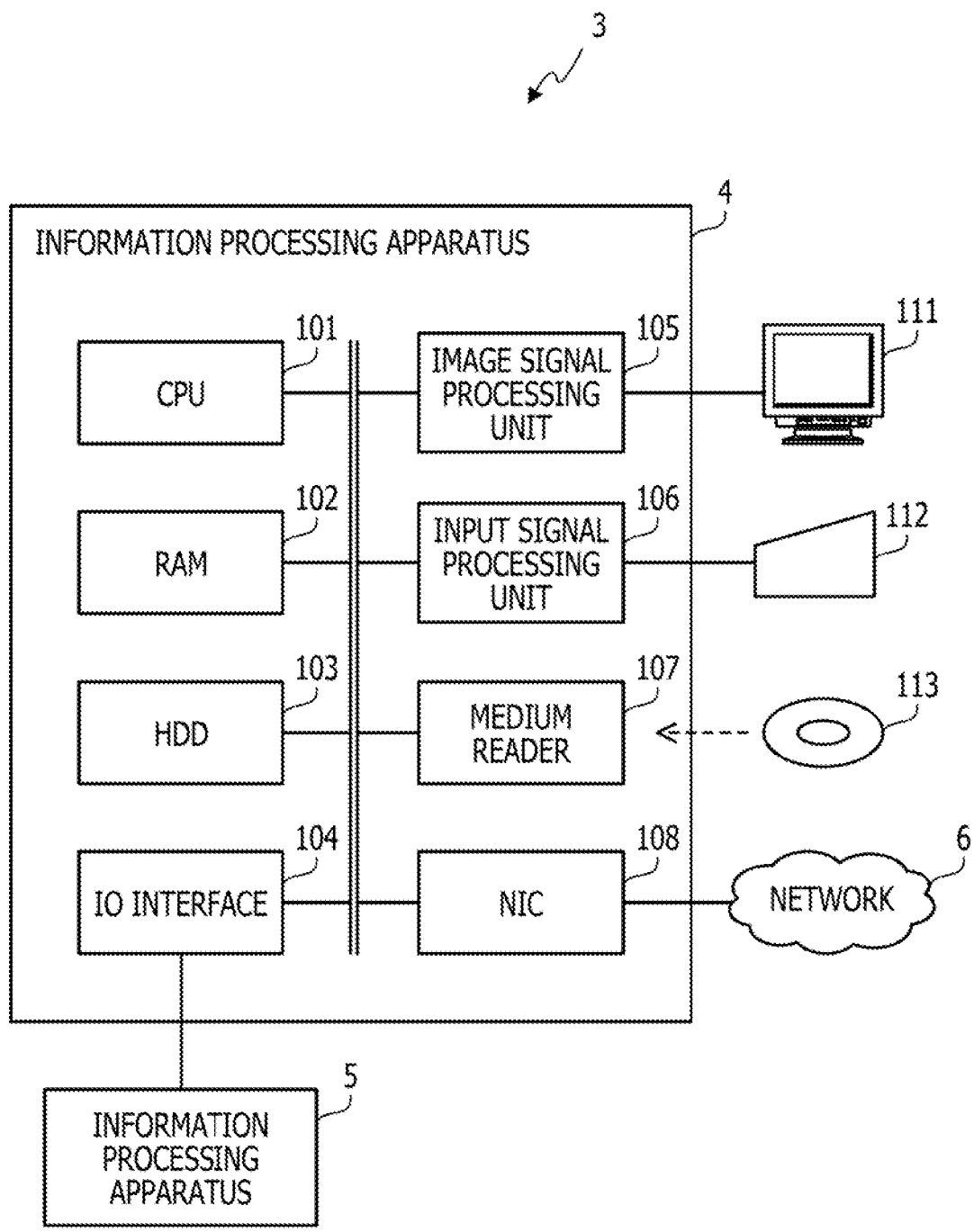
FIG. 13 illustrates an example of an information processing system according to a third embodiment.

FIG. 13 illustrates an example of an information processing system according to the third embodiment.

An information processing system 3 includes an information processing apparatus 4 and an information processing apparatus 5.

The information processing apparatus 4 includes a CPU 101, a RAM 102, a hard disk drive (HDD) 103, an input/output (IO) interface 104, an image signal processing unit 105, an input signal processing unit 106, a medium reader 107, and a network interface card (NIC) 108.

The CPU 101 is a processor that executes a command of a program. The CPU 101 loads at least a part of a program or data stored in the HDD 103 into the RAM 102, and executes the program. The CPU 101 may include a plurality of processor cores. The information processing apparatus 4 may include a plurality of processors. A set of the plurality of processors may be referred to as a "multiprocessor" or simply a "processor".

The RAM 102 is a volatile semiconductor memory that temporarily stores the program executed by the CPU 101 and data used for the operation by the CPU 101. The information processing apparatus 4 may include memories of types other than the RAM, and may include a plurality of memories.

The HDD 103 is a non-volatile storage device that stores data as well as programs of software such as an operating system (OS), middleware, and application software. The information processing apparatus 4 may include other types of storage devices such as a flash memory and a solid-state drive (SSD), and may include a plurality of non-volatile storage devices.

The IO interface 104 is coupled to the information processing apparatus 5, and outputs and inputs data to and from the information processing apparatus 5 in accordance with an instruction from the CPU 101. For example, the 10 interface 104 writes data in the RAM 102 to a register or a memory of the information processing apparatus 5 or reads data from the Information processing apparatus 5 and writes the data to the RAM 102 in accordance with an instruction from the CPU 101. As the 10 interface 104, for example, a Peripheral Component Interconnect-Express (PCI-e) or the like is used.

The image signal processing unit 105 outputs an image to a display 111 coupled to the information processing apparatus 4 in accordance with an instruction from the CPU 101. As the display 111, any type of display such as a cathode ray tube (CRT) display, a liquid crystal display (LCD), a plasma display, or an organic electro-luminescence (OEL) display may be used.

The input signal processing unit 106 acquires an input signal from an input device 112 coupled to the information processing apparatus 4, and outputs the input signal to the CPU 101. As the input device 112, a pointing device such as a mouse, a touch panel, a touchpad, or a trackball, a keyboard, a remote controller, a button switch, or the like may be used. A plurality of types of input devices may be coupled to the information processing apparatus 4.

The medium reader 107 is a reading device that reads programs and data recorded in a recording medium 113. As the recording medium 113, for example, a magnetic disk, an optical disk, a magneto-optical disk (MO), a semiconductor memory, or the like may be used. The magnetic disk includes a flexible disk (FD) or an HDD. The optical disk includes a compact disc (CD) or a digital versatile disc (DVD).

The medium reader 107 copies, for example, the program and data read from the recording medium 113 to another recording medium such as the RAM 102 or the HDD 103. The read program is executed by, for example, the CPU 101. The recording medium 113 may be a portable recording medium, or may be used to distribute the program and data. The recording medium 113 and the HDD 103 may be referred to as a computer-readable recording medium.

The NIC 108 is an interface that is coupled to a network 6 and communicates with another computer via the network 6. The NIC 108 is coupled to a communication device such as a switch or a router included in the network 6, by a cable, for example.

The information processing apparatus 5 is an accelerator that performs a ground state search by the SA method or the replica exchange method by hardware based on information of an energy function. The information processing apparatus 5 may also be referred to as an Ising machine, an optimization apparatus, or the like. Instead of the information processing apparatus 5, the CPU 101 may execute predetermined software to realize the function of the search unit that executes the Markov chain Monte Carlo method such as the SA method or the replica exchange method.

Figure 14:
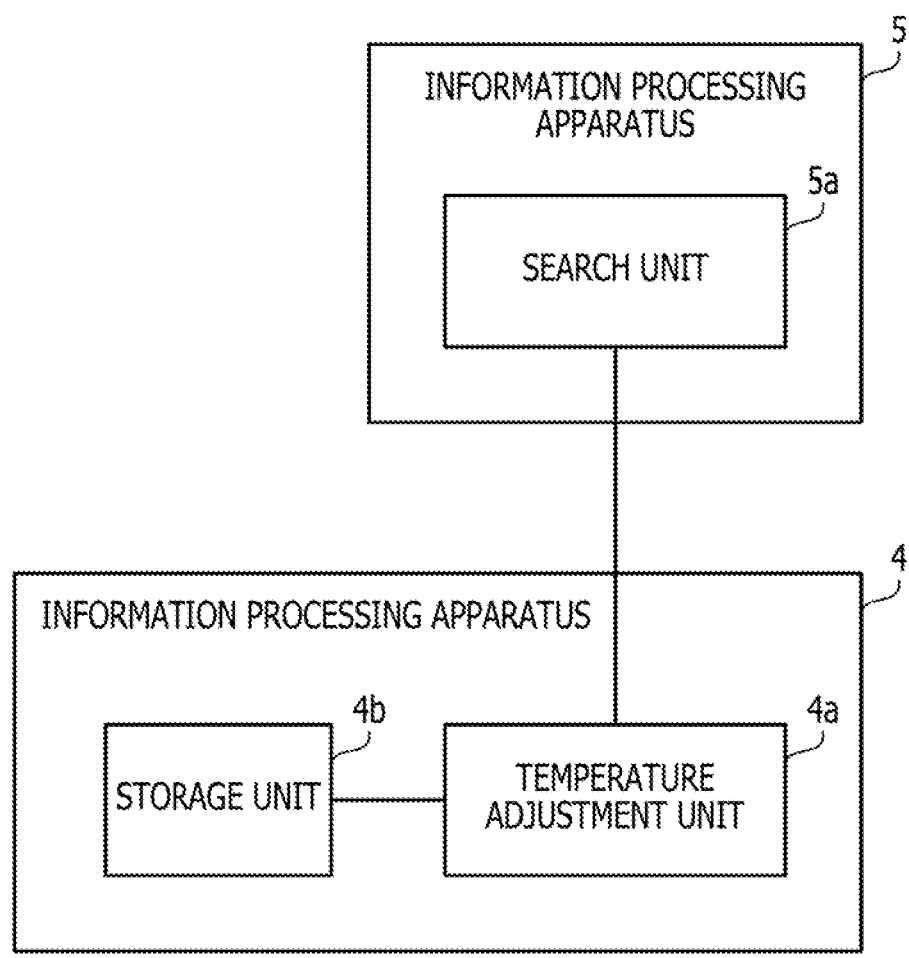
FIG. 14 illustrates an example of functions of the information processing apparatus.

FIG. 14 illustrates an example of functions of the information processing apparatus.

The information processing apparatus 4 includes a temperature adjustment unit 4a and a storage unit 4b. The temperature adjustment unit 4a is realized by the CPU 101 executing a program stored in the RAM 102. As the storage unit 4b, a storage area of the RAM 102 or the HDD 103 is used.

The temperature adjustment unit 4a corresponds to the temperature adjustment unit 1b of the first embodiment or the temperature adjustment unit 2b of the second embodiment, and executes the same processing as the temperature adjustment unit 1b or the temperature adjustment unit 2b based on the energy value acquired from a search unit 5a.

The storage unit 4b corresponds to the storage unit 1c of the first embodiment, and stores the same data as the data stored in the storage unit 1c. Alternatively, the storage unit 4b may store the same data as the data stored in the smallest energy register 31 and the number of times of update register 32 of the second embodiment.

The information processing apparatus 5 includes the search unit 5a. The search unit 5a corresponds to the search unit 1a of the first embodiment or the search unit 2a of the second embodiment, and executes the same processing as the search unit 1a or the search unit 2a. The search unit 5a may include a circuit corresponding to one replica circuit and perform a search for the ground state by the SA method, or may include a plurality of replica circuits and perform a search for the ground state by the replica exchange method.

The function of the temperature control unit included in the search unit 5a may be provided in the information processing apparatus 4. For example, the temperature control unit may be realized by the CPU 101 executing a program stored in the RAM 102.

In the information processing system 3 according to the third embodiment, the temperature adjustment unit 4a adjusts temperature values set for the search unit Sa in the same manner as the temperature adjustment unit 1b and the temperature adjustment unit 2b. Thus, in a case where the function of the temperature adjustment unit 4a is realized by the information processing apparatus 4 different from the information processing apparatus 5 including the search unit 5a, temperature values suitable for a problem may be acquired as in the first and second embodiments.

The functions of the search unit 1a and the temperature adjustment unit 1b of the first embodiment may be realized by causing a CPU included in the information processing apparatus 1 to execute a program. The functions of the search unit 2a, the temperature adjustment unit 2b, and the overall control unit 2c of the second embodiment may be realized by causing a CPU included in the information processing apparatus 2 to execute a program. The function of the temperature adjustment unit 4a of the third embodiment may be realized by causing the CPU 101 to execute a program. The program may be recorded in the computer-readable recording medium 113.

For example, the program may be circulated by distributing the recording medium 113 in which the program is recorded. The program may be stored in another computer, and the program may be distributed through a network. For example, the computer may store (install), in a storage device such as the RAM 102 or the HDD 103, the program recorded in the recording medium 113 or the program received from the other computer, and may read the program from the storage device to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus of solving a combinatorial optimization problem, the information processing apparatus comprising:

search circuitry configured to use a Markov Chain Monte Carlo method to perform, within a temperature range including a plurality of temperature values, a search for a ground state represented by a plurality of state variables included in an Ising-type energy function and held obtained by formulating the combinatorial optimization problem, the search circuitry holding a value of the Ising-type energy function for the plurality of state variables; and temperature adjustment circuitry configured to:

acquire, for each temperature value of the plurality of temperature values in descending order, a value of the Ising-type energy function obtained by the search circuitry for the plurality of state variables at the each temperature value among the plurality of temperature values;

determine, for the each temperature value of the plurality of temperature value in descending order, whether the value acquired for the each temperature value is smaller than a smallest value among one or more values of the Ising-type energy function acquired before reaching the each temperature value in descending order;

record, for the each temperature value of the plurality of temperature values, update information based on a result of the determining for the temperature value, the update information indicates, for the each temperature value of the plurality of temperature values, whether the smallest value has been updated at the each temperature value, and is updated to indicate that the smallest value has been updated at the each temperature value in a case where the result of the determining for the each temperature value indicates that the value acquired for the each temperature value is smaller than the smallest value; and in a case where the acquiring and the determining with respect to all of the plurality of temperature values in descending order have been completed, adjust the temperature range based on one or more of temperature values among the plurality of temperature values, each of the one or more of temperature values being a temperature value at which the update information indicates that the smallest value has been updated, and set the adjusted temperature range to the search circuitry in order to cause the search circuitry to perform within the adjusted temperature range a search for the ground state;

wherein the search circuitry is configured to perform the search within the each temperature range by using each of a first set and a second set of the plurality of state variables, and wherein the temperature adjustment circuitry is configured to:

determine, for each of the plurality of temperature values in descending order, whether a first value of the Ising-type energy function at the first temperature value is smaller than a first smallest value of the Ising-type energy function acquired by using the first set before reaching the each temperature value;

in response to determining that the first value acquired for the each temperature values is smaller than the first smallest value, record the update information for the each temperature value;

determine, for each of the plurality of temperature values in descending order, whether a second smallest value of the Ising-type energy function acquired by using the second set before reaching the each temperature value; and in response to determining that the second value acquired for the each temperature value is smaller than the second smallest value, record the update information for the each temperature value;

wherein the search circuitry is configured to execute the search by the first set and the search by the second set in parallel;

wherein the search circuitry is configured to exchange, based on a predetermined exchange probability, a temperature value used in the search by the first set among the plurality of temperature values with another temperature value used in the search by the second set among the plurality of temperature values.

2. The information processing apparatus according to claim 1, wherein the temperature adjustment circuitry is configured to acquire, as the value for the each of the plurality of temperature values in descending order, the value that is smallest among a plurality of the values of the Ising-type energy function obtained for the plurality of state variables at the each temperature value.

3. The information processing apparatus according to claim 1, wherein the temperature adjustment circuitry is configured to:

update the first smallest value held for the first set to the first value when the first value is smaller than the first smallest value;

update the second smallest value held for the second set to the second value when the second value is smaller than the second smallest value;

record, as the update information, the number of times the first smallest value and the second smallest value have been updated for each of the plurality of temperature values; and specify the first temperature value used to determine the adjusted temperature range among the plurality of temperature values based on the number of times recorded for each of the plurality of temperature values.

4. The information processing apparatus according to claim 3, wherein the adjusted temperature range includes a new maximum temperature value and a new minimum temperature value used for the search, and wherein the temperature adjustment circuitry is configured to:

specify two or more temperature values for which the number of times recorded is larger than a threshold among the plurality of temperature values;

determine a largest temperature value among the two or more temperature values as the maximum temperature value; and determine a smallest temperature value among the two or more temperature values as the minimum temperature value.

5. The information processing apparatus according to claim 3, wherein the temperature adjustment circuitry is configured to:

calculate a statistical value of temperature values at which the smallest value of the Ising-type energy function has been updated, from the number of times for each of the plurality of temperature values; and specify the first temperature value used to determine the second adjusted temperature range based on the statistical value.

6. The information processing apparatus according to claim 1, wherein the temperature adjustment circuitry is configured to output the second temperature value to the search circuitry, and wherein the search circuitry is configured to:

determine a plurality of other temperature values based on the adjusted temperature range; and perform the search for the ground state corresponding to the Ising-type energy function by using the plurality of other temperature values.

7. An information processing method implemented by a computer of solving a combinatorial optimization problem, the computer including search circuitry configured to use a Markov Chain Monte Carlo method to perform within a temperature range including a plurality of temperature values a search for a ground state represented by a plurality of state variables included in an Ising-type energy function obtained by formulating the combinatorial optimization problem, the method comprising:

acquiring, for each temperature value of the plurality of temperature values in descending order, a value of the Ising-type energy function obtained by the search circuitry for the plurality of state variables at the each temperature value among the plurality of temperature values;

determining, for the each temperature value of the plurality of temperature value in descending order, whether the value acquired for the each temperature value is smaller than a smallest value among one or more values of the Ising-type energy function acquired before reaching the each temperature value in descending order;

recording, for the each temperature value of the plurality of temperature values, update information based on a result of the determining for the temperature value, the update information indicates, for the each temperature value of the plurality of temperature values, whether the smallest value has been updated at the each temperature value, and is updated to indicate that the smallest value has been updated at the each temperature value in a case where the result of the determining for the each temperature value indicates that the value acquired for the each temperature value is smaller than the smallest value; and in a case where the acquiring and the determining with respect to all of the plurality of temperature values in descending order have been completed, adjusting the temperature range based on one or more of temperature values among the plurality of temperature values, each of the one or more of temperature values being a temperature value at which the update information indicates that the smallest value has been updated, and setting the adjusted temperature range to the search circuitry in order to cause the search circuitry to perform within the adjusted temperature range a search for the ground state;

wherein the search circuitry performs the search within the each temperature range by using each of a first set and a second set of the plurality of state variables, and wherein the temperature adjustment circuitry:

determines, for each of the plurality of temperature values in descending order, whether a first value of the Ising-type energy function at the first temperature value is smaller than a first smallest value of the Ising-type energy function acquired by using the first set before reaching the each temperature value;

in response to determining that the first value acquired for the each temperature values is smaller than the first smallest value, record the update information for the each temperature value;

determines, for each of the plurality of temperature values in descending order, whether a second value of the Ising-type energy function at the each temperature value is smaller than a second smallest value of the Ising-type energy function acquired by using the second set before reaching the each temperature value; and in response to determining that the second value acquired for the each temperature value is smaller than the second smallest value, record the update information for the each temperature value;

wherein the search circuitry executes the search by the first set and the search by the second set in parallel;

wherein the search circuitry exchanges, based on a predetermined exchange probability, a temperature value used in the search by the first set among the plurality of temperature values with another temperature value used in the search by the second set among the plurality of temperature values.

8. A non-transitory computer-readable storage medium for storing a program which causes an information processing apparatus, which is a computer of solving a combinatorial optimization problem, to perform processing, the computer including search circuitry configured to use a Markov Chain Monte Carlo method to perform within a temperature range including a plurality of temperature values a search for a ground state represented by a plurality of state variables included in an Ising-type energy function obtained by formulating the combinatorial optimization problem, the processing comprising:

acquiring, for each temperature value of the plurality of temperature values in descending order, a value of the Ising-type energy function obtained by the search circuitry for the plurality of state variables at the each temperature value among the plurality of temperature values;

determining, for the each temperature value of the plurality of temperature value in descending order, whether the value acquired for the each temperature value is smaller than a smallest value among one or more values of the Ising-type energy function acquired before reaching the each temperature value in descending order;

recording, for the each temperature value of the plurality of temperature values, update information based on a result of the determining for the temperature value, the update information indicates, for the each temperature value of the plurality of temperature values, whether the smallest value has been updated at the each temperature value, and is updated to indicate that the smallest value has been updated at the each temperature value in a case where the result of the determining for the each temperature value indicates that the value acquired for the each temperature value is smaller than the smallest value; and in a case where the acquiring and the determining with respect to all of the plurality of temperature values in descending order have been completed, adjusting the temperature range based on one or more of temperature values among the plurality of temperature values, each of the one or more of temperature values being a temperature value at which the update information indicates that the smallest value has been updated, and setting the adjusted temperature range to the search circuitry in order to cause the search circuitry to perform within the adjusted temperature range a search for the ground state;

wherein the search circuitry performs the search within the each temperature range by using each of a first set and a second set of the plurality of state variables, and wherein the temperature adjustment circuitry:

determines, for each of the plurality of temperature values in descending order, whether a first value of the Ising-type energy function at the first temperature value is smaller than a first smallest value of the Ising-type energy function acquired by using the first set before reaching the each temperature value;

in response to determining that the first value acquired for the each temperature values is smaller than the first smallest value, record the update information for the each temperature value;

determines, for each of the plurality of temperature values in descending order, whether a second value of the Ising-type energy function at the each temperature value is smaller than a second smallest value of the Ising-type energy function acquired by using the second set before reaching the each temperature value; and in response to determining that the second value acquired for the each temperature value is smaller than the second smallest value, record the update information for the each temperature value;

wherein the search circuitry executes the search by the first set and the search by the second set in parallel;

wherein the search circuitry exchanges, based on a predetermined exchange probability, a temperature value used in the search by the first set among the plurality of temperature values with another temperature value used in the search by the second set among the plurality of temperature values.

* * * * *